United States Patent [19]

Spence

[11] Patent Number: 5,358,344
[45] Date of Patent: Oct. 25, 1994

[54] KEYBOARD WITH FULL-TRAVEL, SELF-LEVELING KEYSWITCHES

[75] Inventor: Kenny R. Spence, Bend, Oreg.

[73] Assignee: Key Tronic Corporation, Spokane, Wash.

[21] Appl. No.: 93,042

[22] Filed: Jul. 15, 1993

Related U.S. Application Data

[63] Continuation-in-part of Ser. No. 939,103, Sep. 1, 1992, abandoned.

[51] Int. Cl.⁵ ............................................... B41J 5/12
[52] U.S. Cl. ................................... 400/490; 400/472; 200/5 A; 200/343
[58] Field of Search ............... 200/5 A, 341, 342, 343, 200/344, 345, 512, 513, 514, 515, 516, 517; 400/472, 490, 491, 495, 491.1, 491.2, 491.3

[56] References Cited

U.S. PATENT DOCUMENTS

| | | | |
|---|---|---|---|
| 3,140,365 | 7/1964 | Voland | 200/16 |
| 3,582,594 | 6/1971 | Twyford | 200/172 |
| 3,668,356 | 6/1972 | Kekas | 200/172 A |
| 3,829,646 | 8/1974 | Lorteije et al. | 200/345 |
| 3,879,025 | 4/1975 | Dillard | 267/165 |
| 3,982,018 | 9/1976 | Demler, Jr. | 200/517 |
| 4,359,612 | 11/1992 | Rooney | 200/5 R |
| 4,376,238 | 3/1983 | Martin | 200/5 A X |
| 4,490,587 | 12/1984 | Miller et al. | 200/5 A |
| 4,491,702 | 1/1985 | Kato | 200/5 A |
| 4,500,218 | 2/1985 | Nishikawa | 400/490 |
| 4,540,865 | 9/1985 | Calder | 200/52 |
| 4,588,093 | 5/1986 | Field | 211/51 |
| 4,604,509 | 8/1986 | Clancy et al. | 200/513 X |
| 4,668,843 | 5/1987 | Watanabe et al. | 200/517 |
| 4,764,770 | 8/1988 | Church | 200/512 |
| 4,839,474 | 6/1989 | Hayes-Pankhurst et al. | 200/5 A |
| 5,003,140 | 3/1991 | Abell, Jr. et al. | 200/344 |

FOREIGN PATENT DOCUMENTS

| | | | |
|---|---|---|---|
| 0094066 | 5/1983 | European Pat. Off. | |
| 0241667 | 2/1987 | European Pat. Off. | |
| 0240791 | 10/1987 | European Pat. Off. | 200/513 |
| 2054268 | 2/1981 | United Kingdom | 200/513 |

*Primary Examiner*—Edgar S. Burr
*Assistant Examiner*—Christopher A. Bennett
*Attorney, Agent, or Firm*—Wells, St. John, Roberts, Gregory & Matkin

[57] ABSTRACT

An improved alphanumeric keyboard 10 is illustrated for use in lap top or notebook personal computers 12. The keyboard 10 has a plurality of full travel, self leveling keyswitches 14 for actuating printed circuit electrical contacts 22 and 26 when the keyswitch is depressed. The keyboard 10 includes an integral keyswitch structure 40 that has an integral keytop and keytop support substructure 44 supported on a common integral base sheet 46. Each of the keytop support substructures 44 includes hinge members 50a, 50b, 50c and 50d that are positioned in a rectangular orientation about the keytop 42. Each hinge member has a rigid upper hinge panel 52 and a lower hinge panel 58 that are integrally interconnected to the keytop 42 and the base sheet 46 for maintaining the keytop in a parallelogram orientation as it is depressed to prevent the keytop from moving laterally or wobbling during depression. The hinge panels 52 and 58 are interconnected by resilient webs 54, 60 and 64 to cause the keytop to be returned to its elevated non-actuating position.

95 Claims, 17 Drawing Sheets

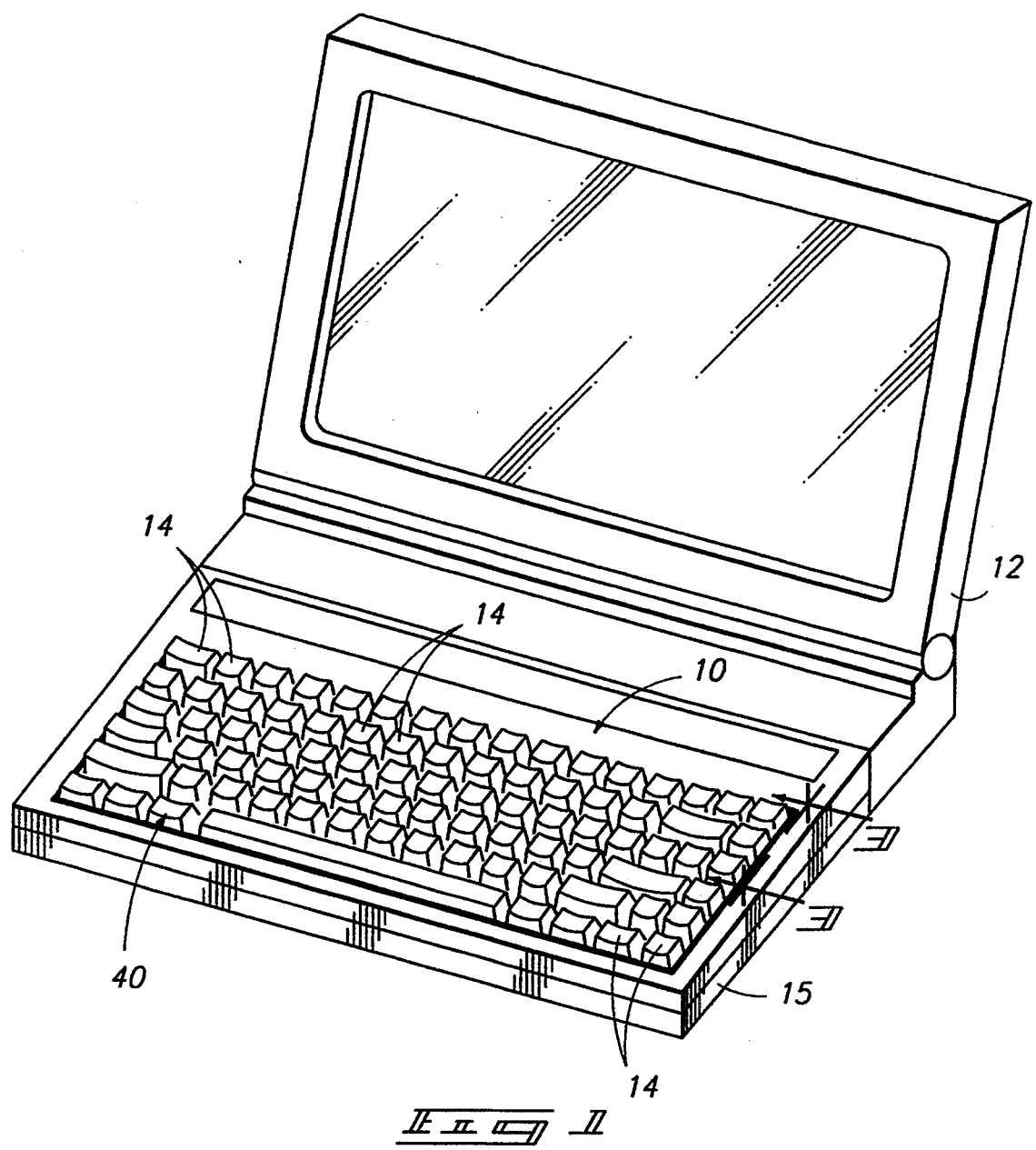

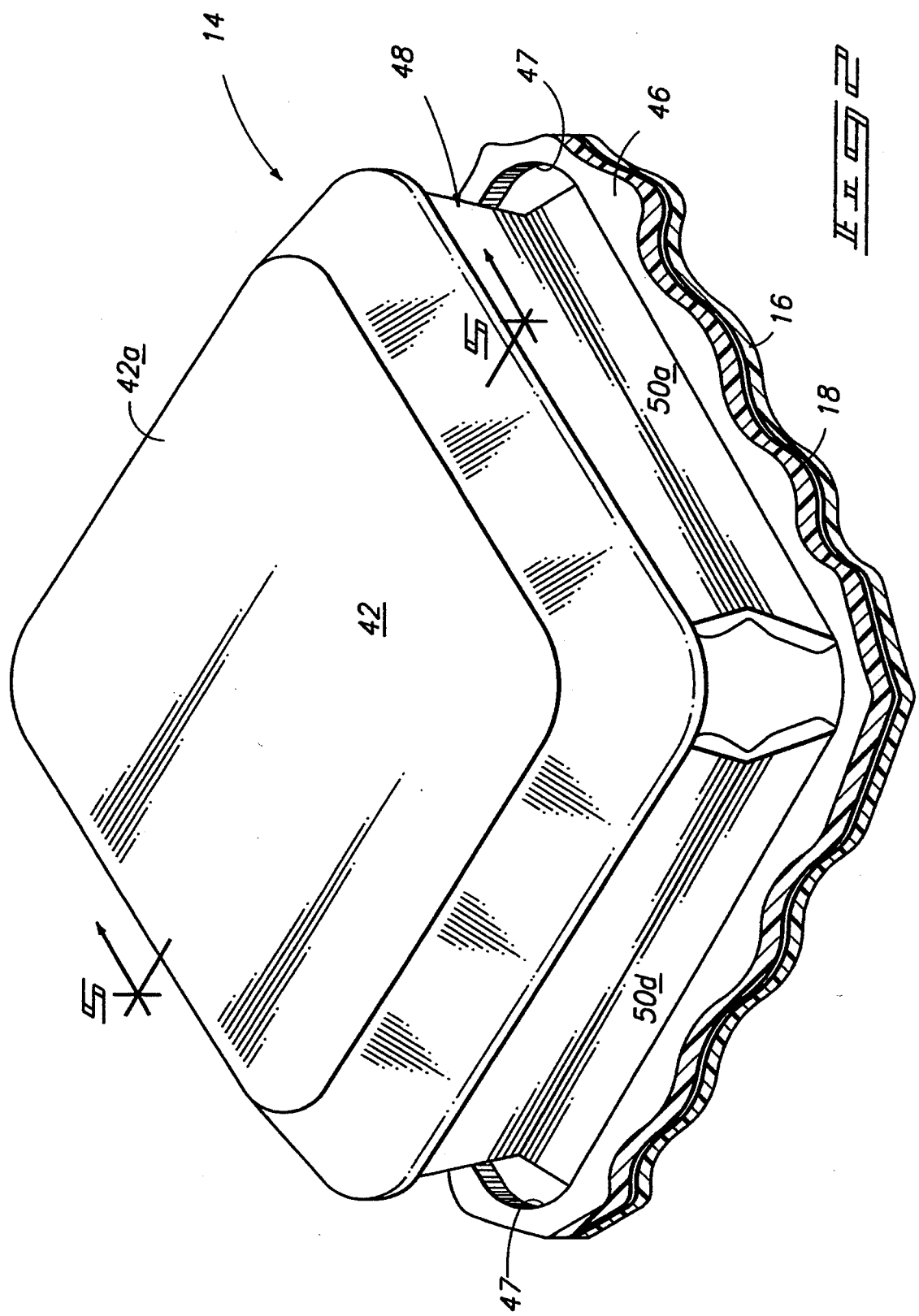

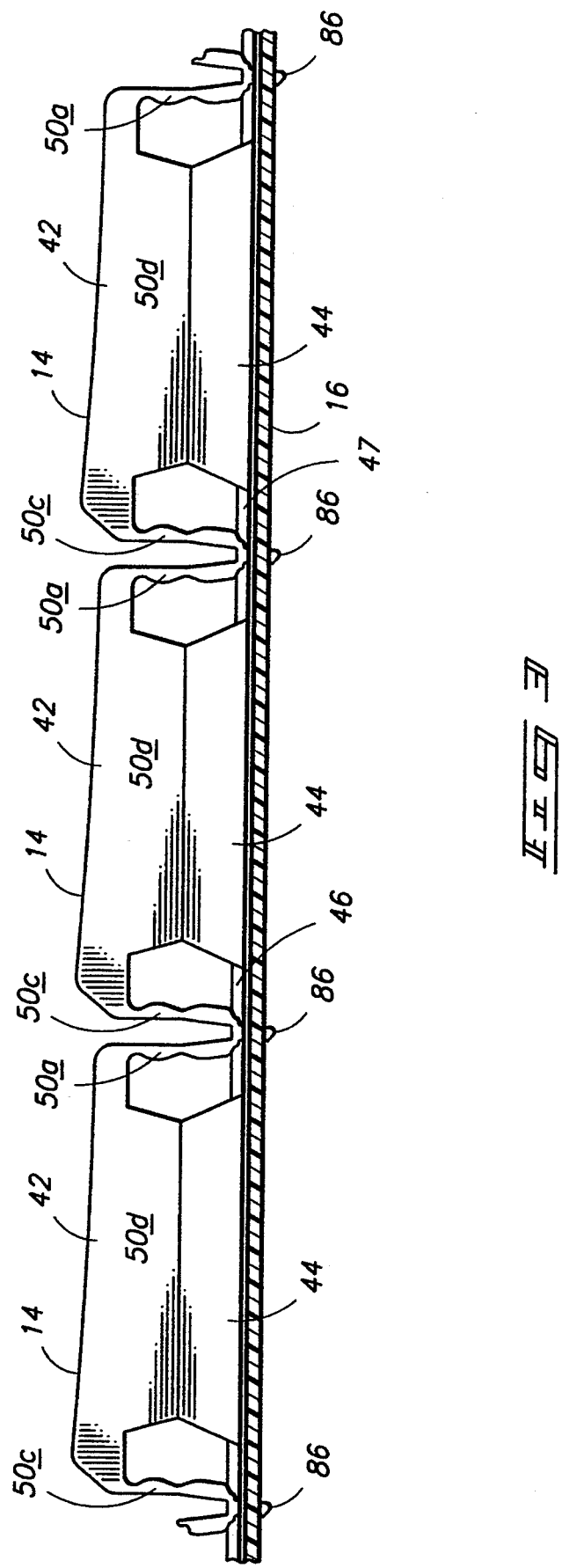

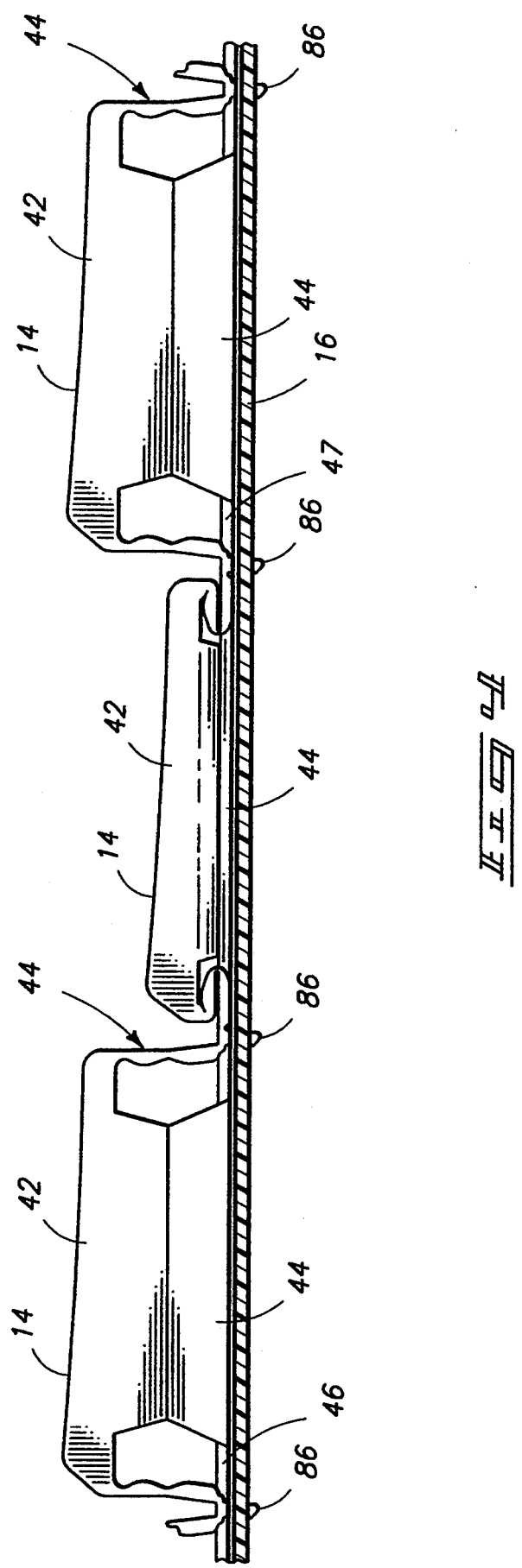

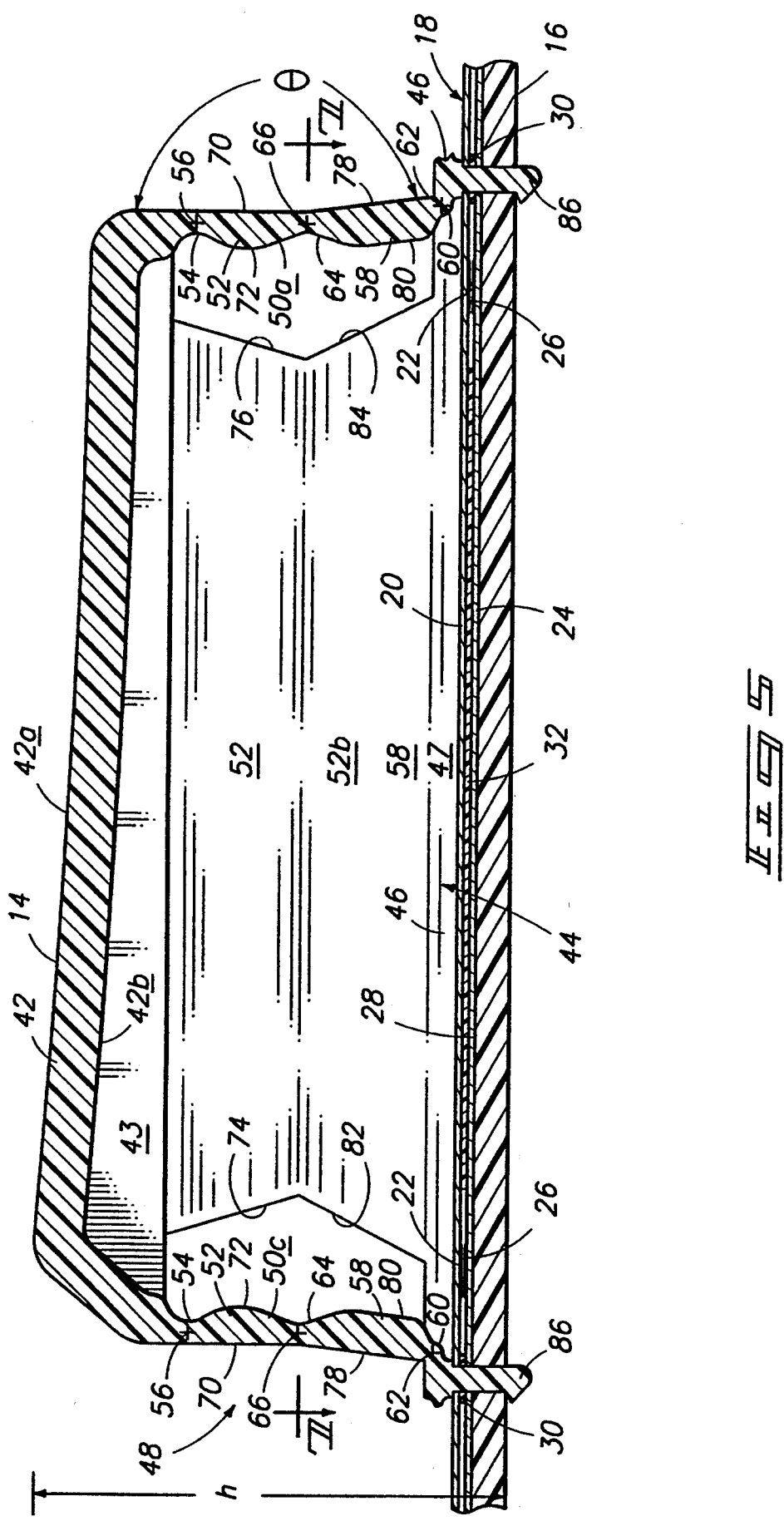

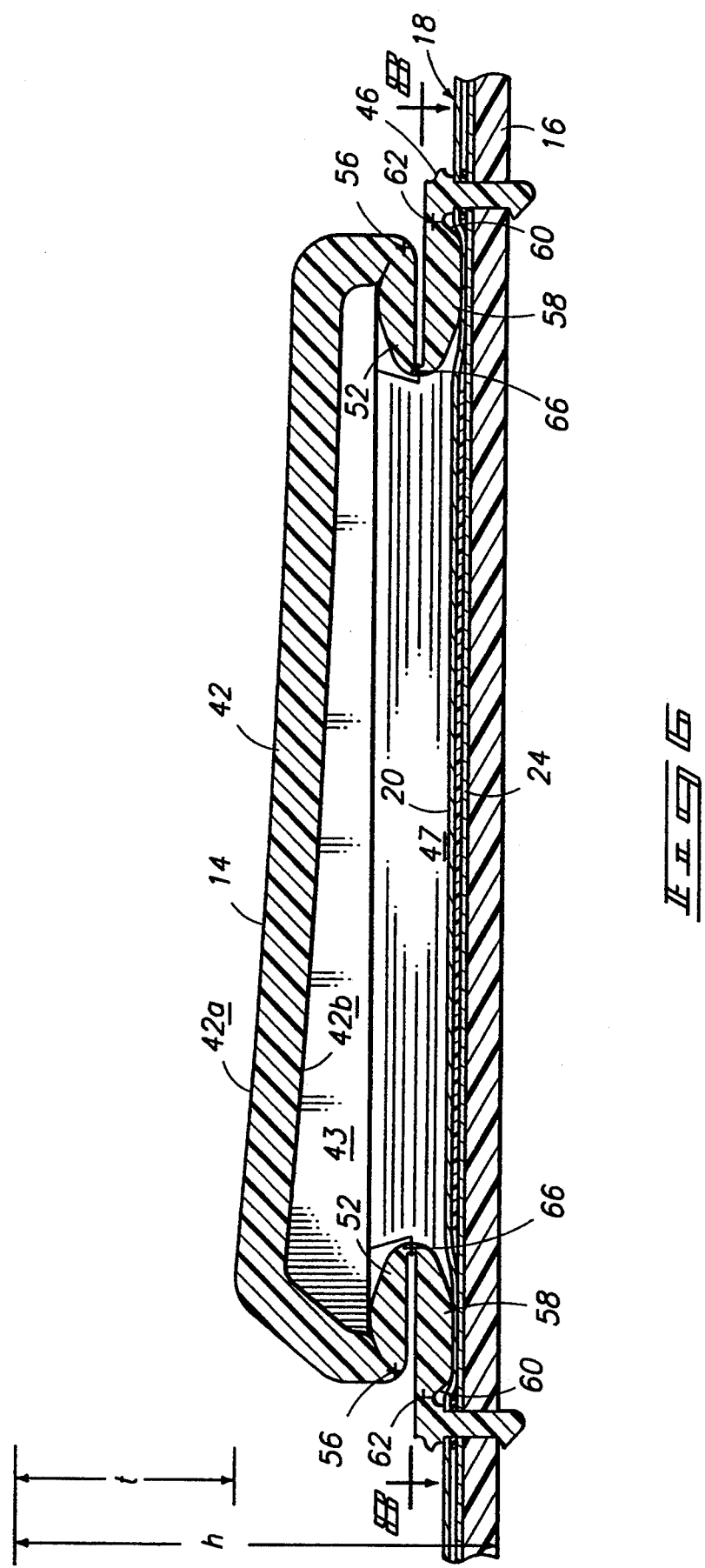

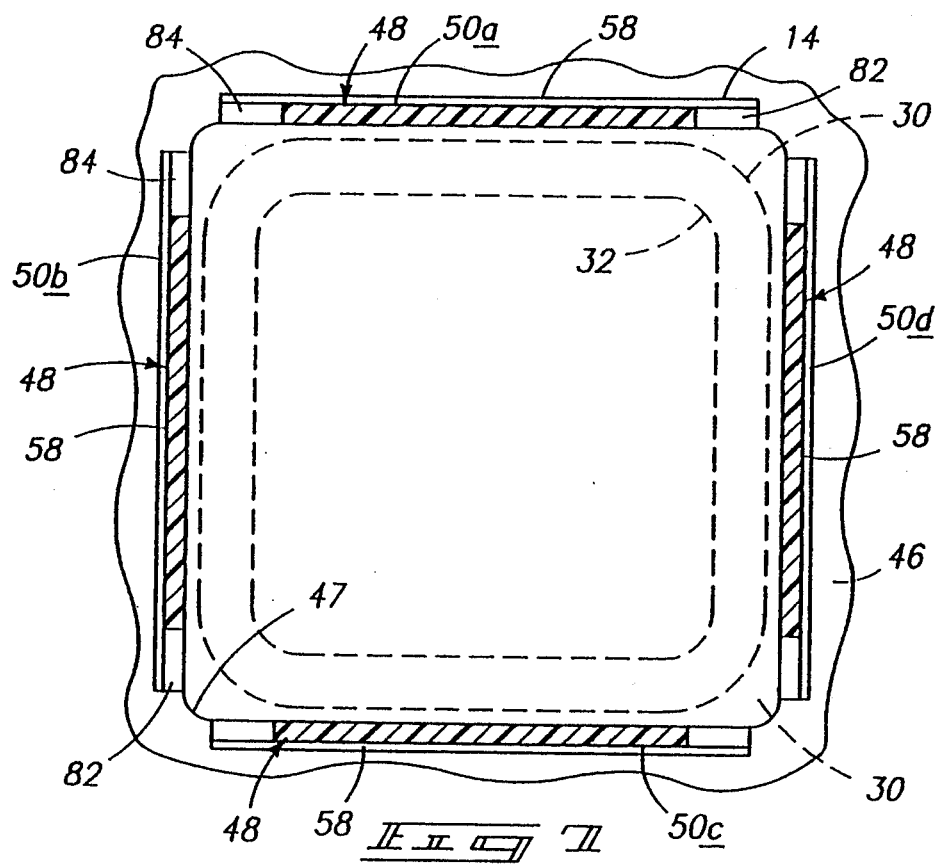
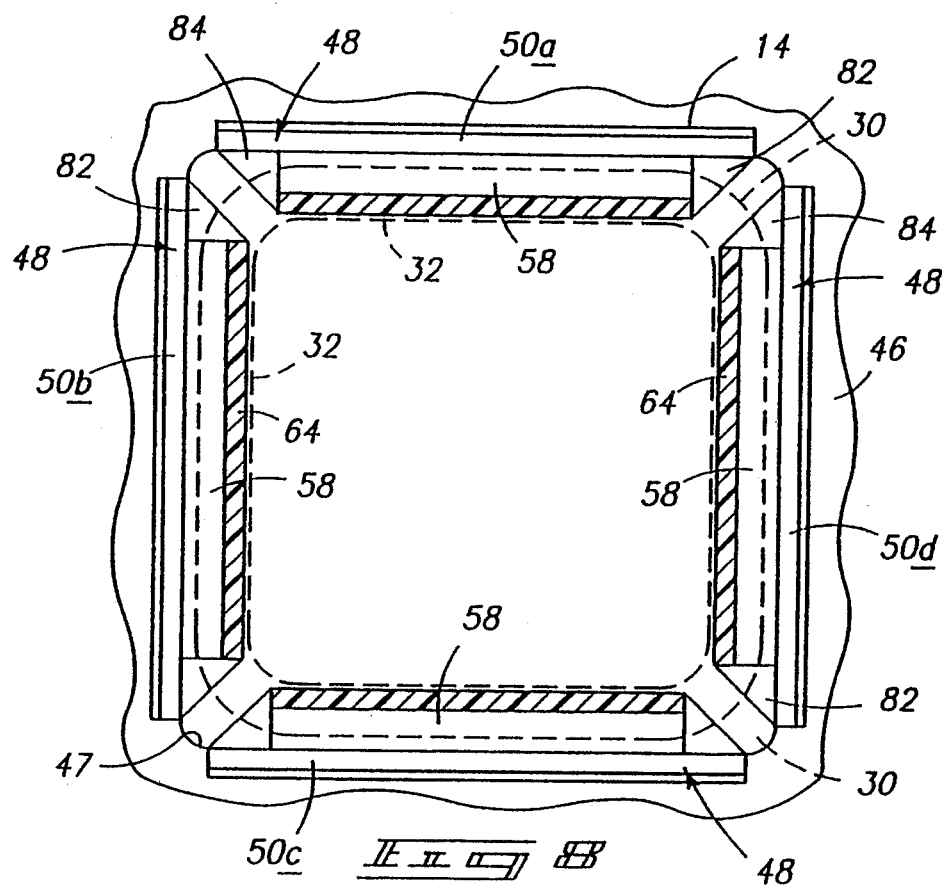

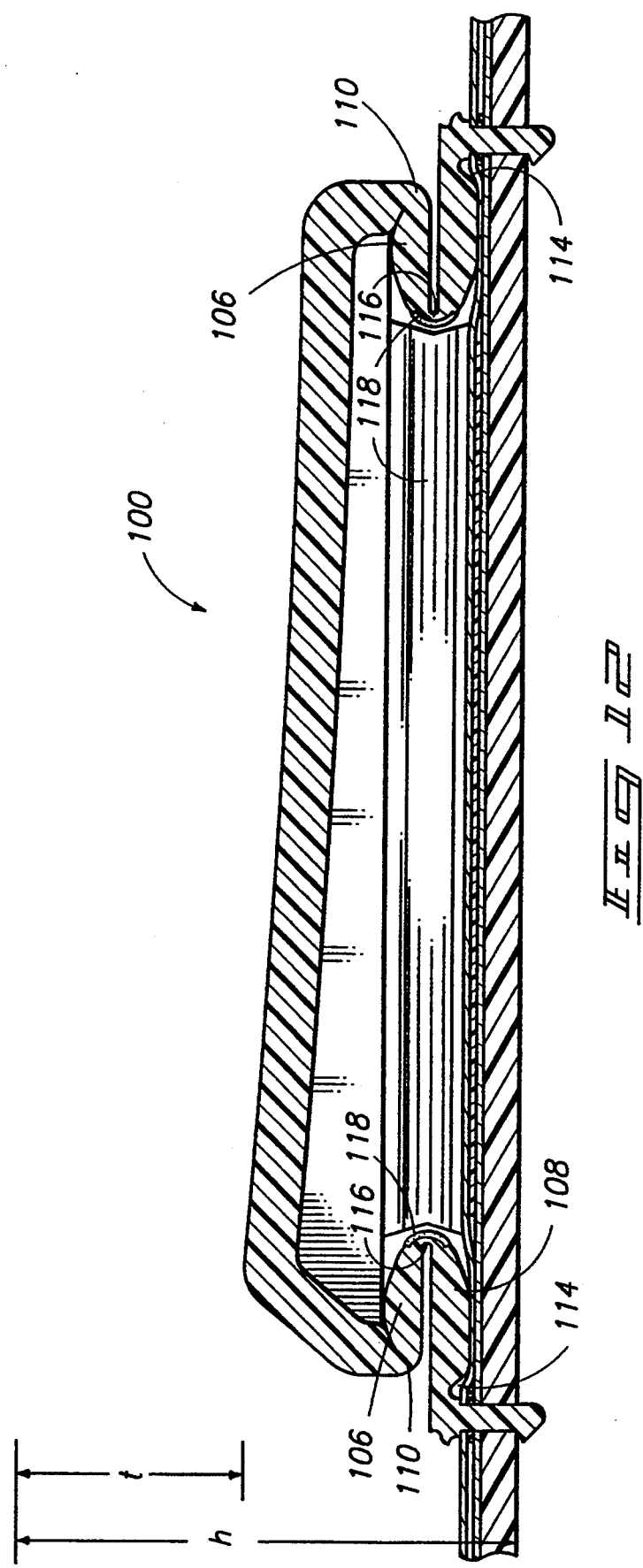

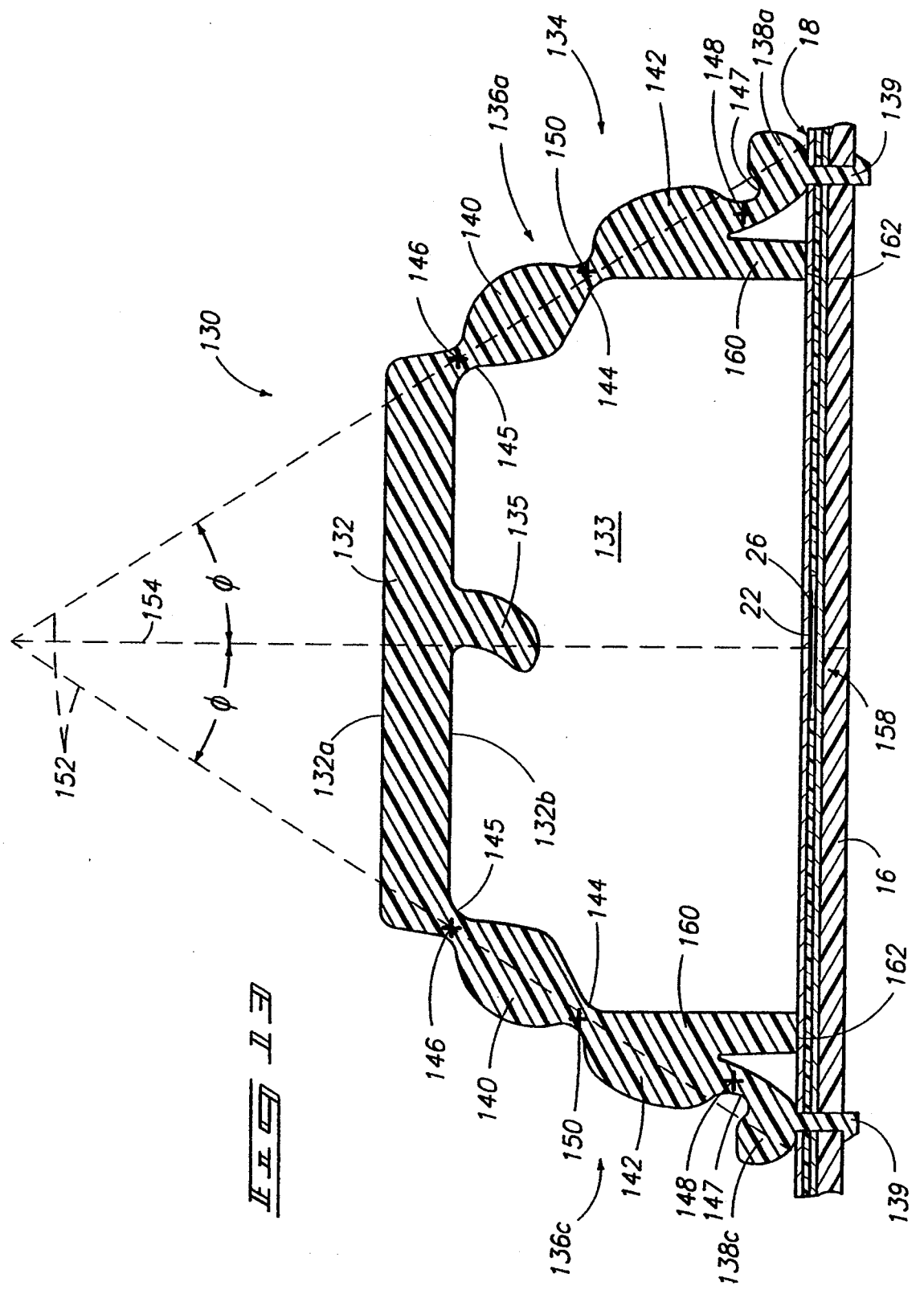

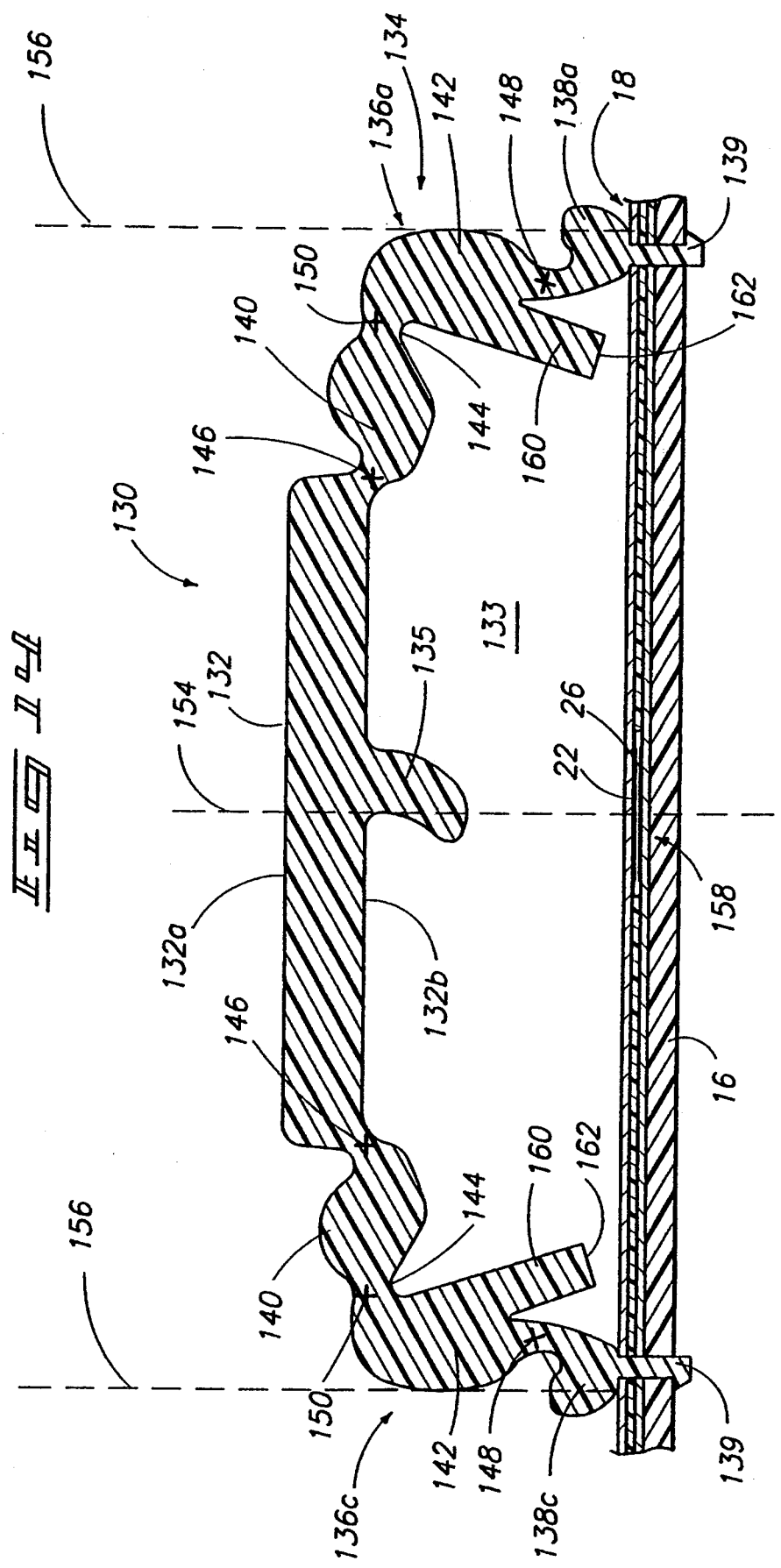

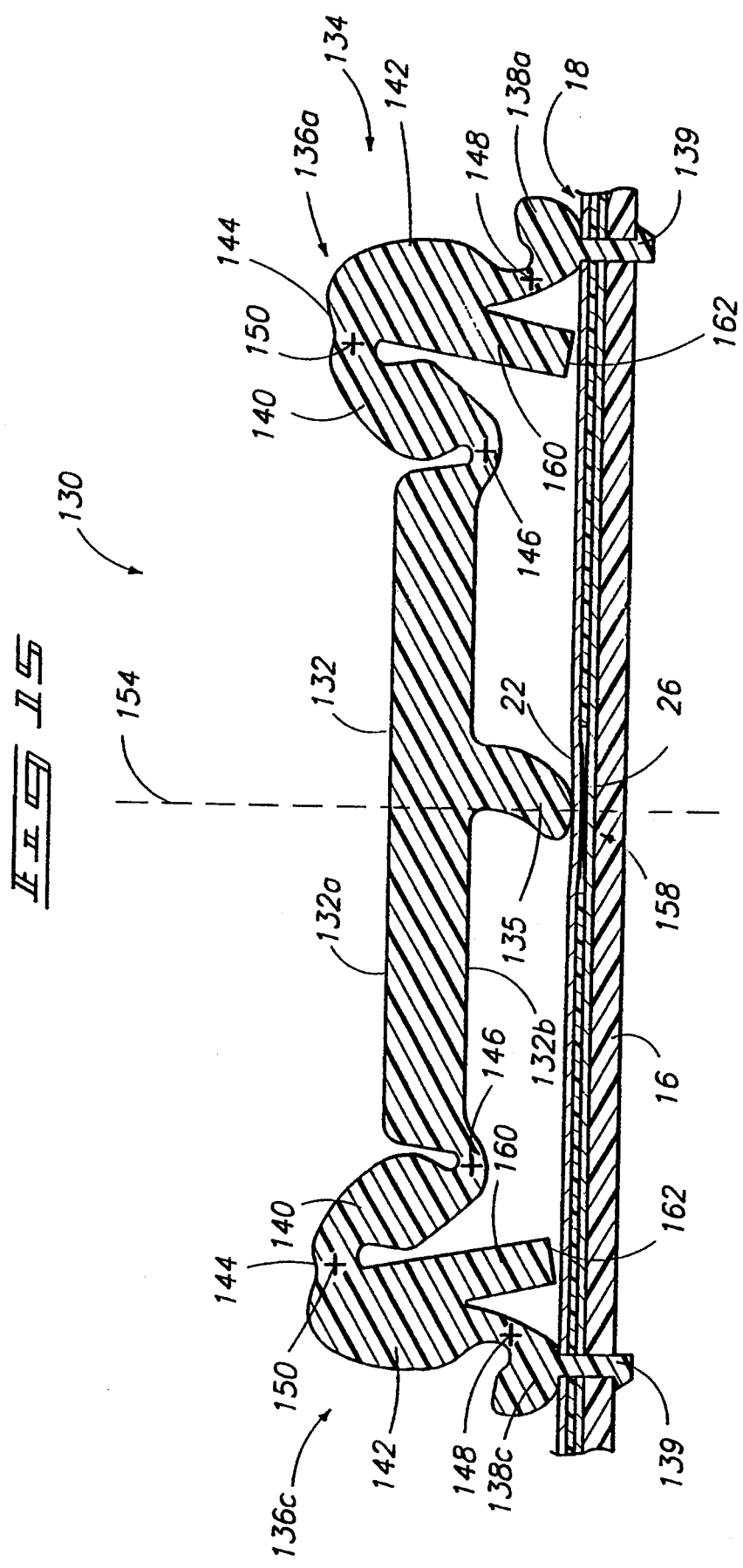

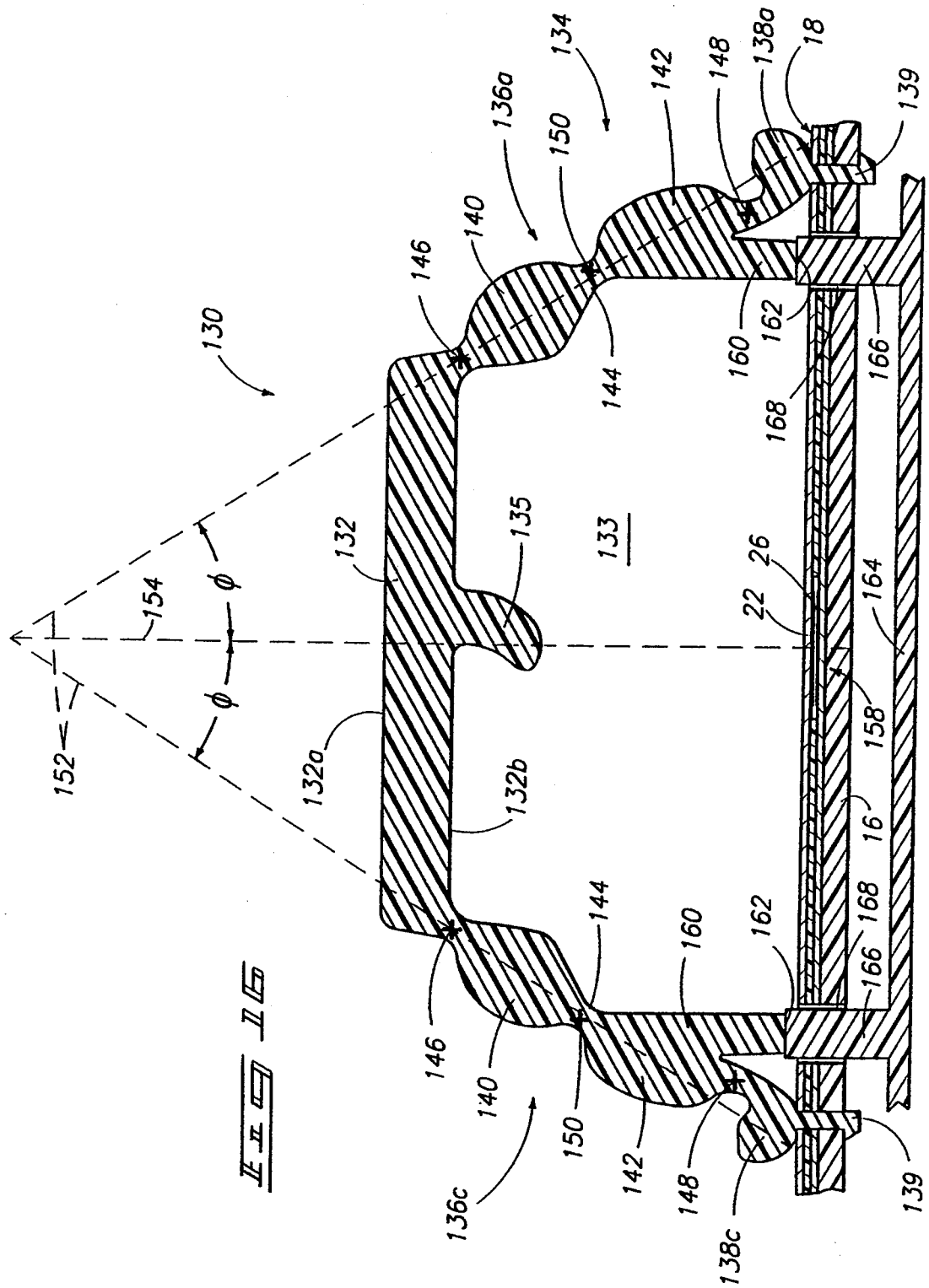

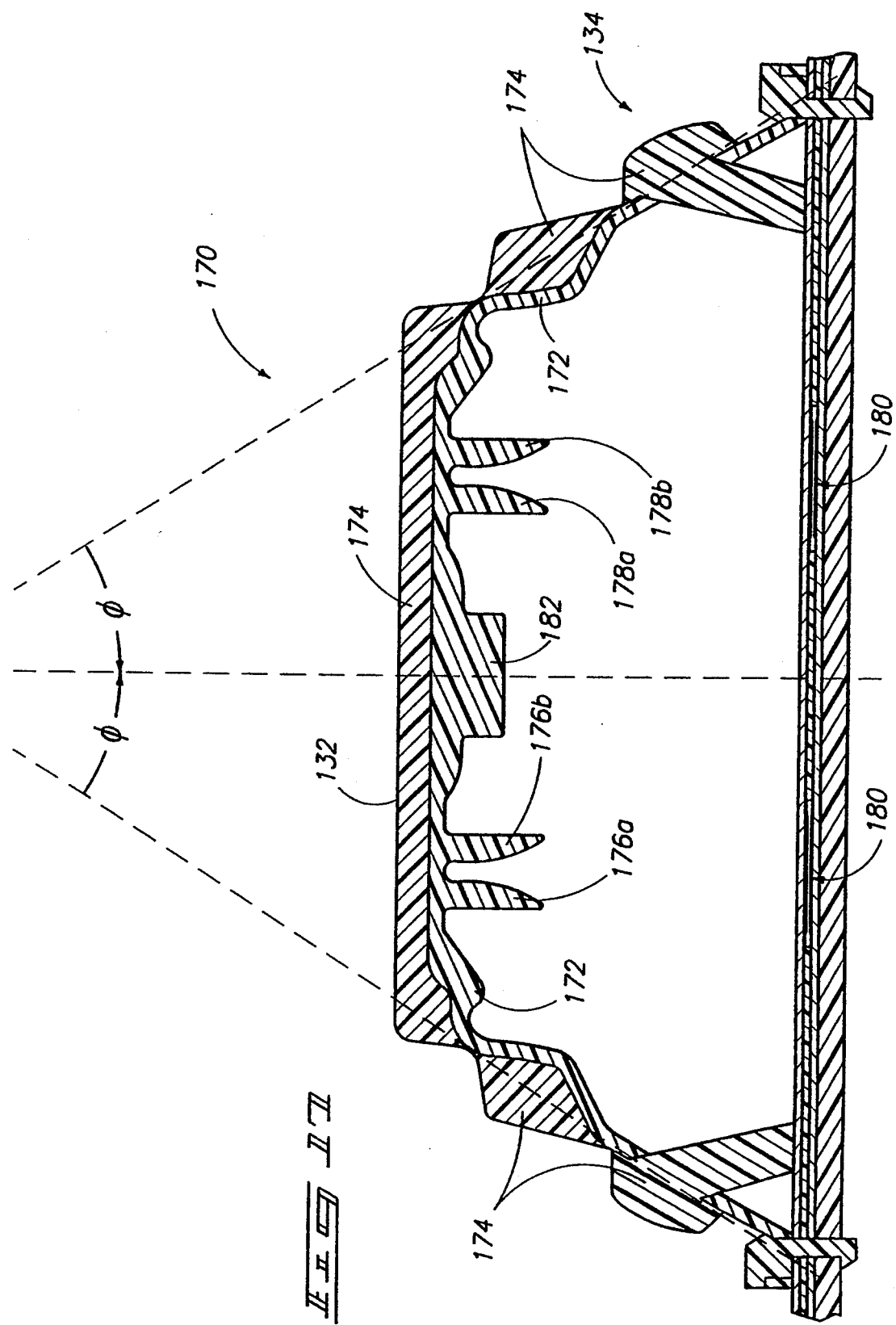

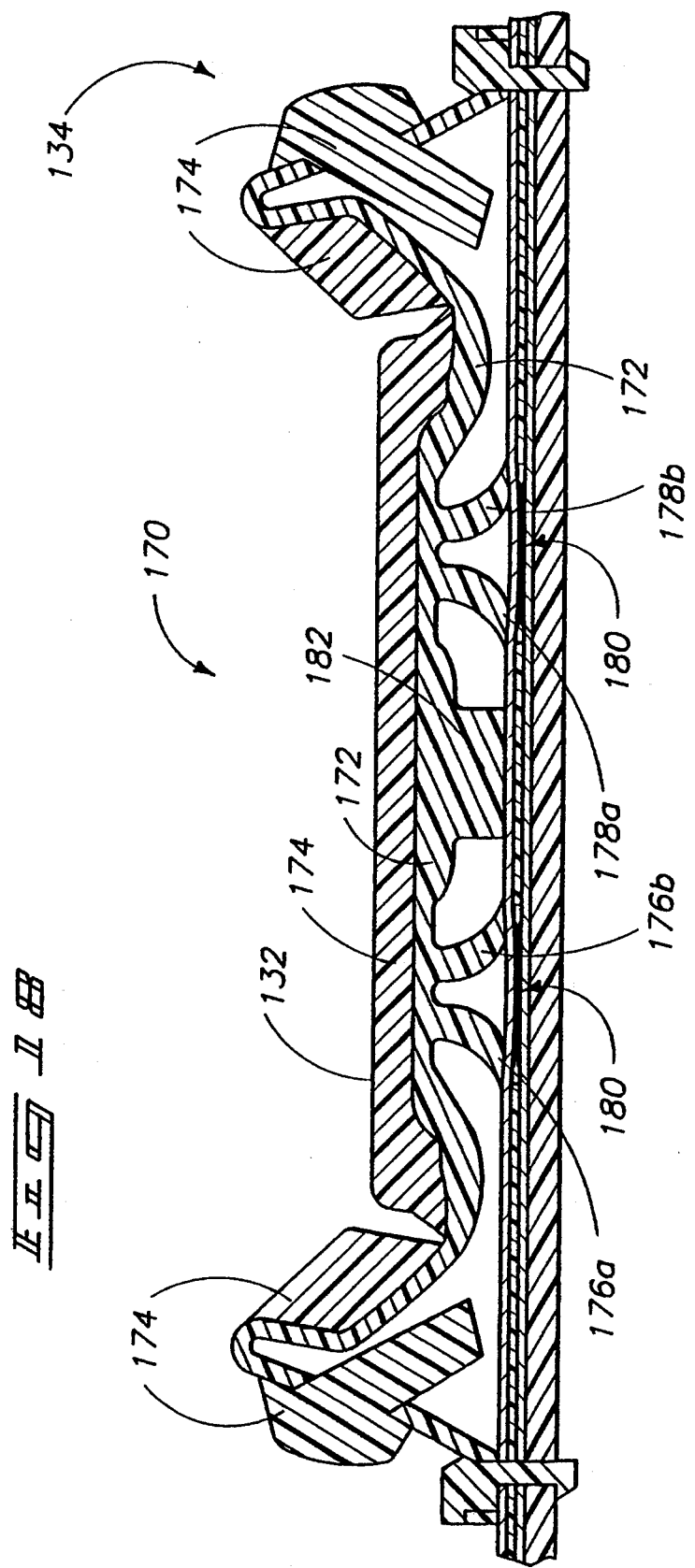

KEYBOARD WITH FULL-TRAVEL, SELF-LEVELING KEYSWITCHES

RELATED APPLICATIONS

This patent resulted from a continuation-in-part application from U.S. patent application Ser. No. 07/939,103, filed Sep. 1, 1992, now abandoned.

TECHNICAL FIELD

This invention is related to keyboards having full travel, self-leveling keyswitches.

BACKGROUND OF THE INVENTION

Conventional keyboards generally include a high profile, full-travel keyswitches that included a plunger that is slidably mounted within a housing. The plunger is designed to slide downwardly in a linear path when the keytop is depressed. Downward pressure on the keytop actuates an electrical switch beneath the plunger.

In many applications, including alphanumeric keyboards for notebook and lap top computers, it is desirable to have keyboards with keyswitches having a shorter overall height, generally referred to as "low profile" keyswitches. One problem which has been encountered in designing low profile keyswitches is that it has been difficult to incorporate desirable characteristics of the prior high profile keyswitches while reducing the keyswitch height. Such desirable characteristics included full-travel so that the amount of downward movement of the keytop would be substantially the same in the "low profile" design as in the "full profile" design. Other favorable features included a tactile field and overtravel. In the past low profile keyboards have been associated with low quality keyswitches that were undesirable for high speed data entry.

A full-travel keyboard generally refers to a substantial movement of the keytop so that an operator will only activate a keyswitch through intentional movement of the keytop over a desired depression distance. Generally a "full-travel" keyboard has keyswitches that require downward movement of approximately four millimeters in travel. A "low profile" keyboard generally refers to the height of the keyswitch assembly from the top of the keytop to the lower part of the keyswitch structure. Preferably it should be approximately eight millimeters or less in total height.

A further desirable feature is that of overtravel in which the electrical contact is made before the keytop is fully depressed. An over-travel feature provides for more reliable switch operation because keyboard operators often inadvertently fail to press the keyswitch down the entire distance, particularly when typing at high rates of speed. When an over-travel feature is provided, the keyswitch will remain activated or "turn on" as long as the plunger is depressed at least to the point where electrical contact is made. The structure provides that the key may be pressed beyond the electrical contact point while maintaining the switch in a closed condition.

It is particularly desirable in notebook and lap top personal computers to minimize the size and weight of the entire computer. The size and weight of the keyboard is very important since it is generally built in or intimately attached to the housing of the personal computer. However the use of low profile keyboards in notebook and lap top personal computers give the impression that such computers are inferior for high speed data entry.

It is further desirable to minimize the number of keyboard components to reduce the costs of manufacture and assembly.

One suggested way to reduce the number of components is to use unitary molded rubber keyboards such as illustrated in the Calder U.S. Pat. No. 4,540,865 granted Sep. 10, 1985 and the Church U.S. Pat. No. 4,764,770 granted Aug. 16, 1988. Molded rubber keyboards have been used in combination with overlying printed circuit boards to provide a keyboard structure which is less expensive than those keyboards having full travel and a separate push button member separately mounted in a frame. The molded rubber keyboards generally comprise a elastomeric sheet integral with upwardly projecting rubber keys. Each elastomeric key is located above a recess in the sheet and has a depending projection to actuate the keyswitches on the printed circuit board located directly below.

A principal disadvantage, besides not being able to provide a full-travel keyboard, is a tendency of each individual keytop of the unitary rubber key structure to wobble or move laterally as it is depressed. The user feels that the keyswitch lacks precision in operation and thus identifies the keyboard as being of a low quality.

To overcome such disadvantages, U.S. Pat. No. 4,540,865 provides guides 38 intermediate the keytops to maintain the keytops substantially level as the keytop is depressed. U.S. Pat. No. 4,764,770 provides an interconnecting membrane 40 for maintaining the keytops in a linear path as the keytops are depressed.

One of the objects of this invention is to provide a keyboard that overcomes the above-identified problems in providing a full-travel keyboard having tactile feel and overtravel features utilizing an integral key structure.

These and other objectives and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

FIG. 1 is an isometric view of a lap top computer having an alphanumeric keyboard with accompanying function keys of the preferred design.

FIG. 2 is a fragmentary enlarged isolation view of a single keyswitch of the keyboard illustrated in FIG. 1, showing a keytop formed integrally with a common base sheet.

FIG. 3 is a vertical cross sectional view taken along lines 3—3 in FIG. 1 showing the side profiles of three adjacent keyswitches in undepressed states.

FIG. 4 is a side elevational view similar to FIG. 3 except showing one of the keyswitches being depressed.

FIG. 5 is a vertical cross sectional view taken along line 5—5 in FIG. 2 showing the internal details of a single keyswitch structure.

FIG. 6 is a vertical cross sectional view similar to FIG. 5 except showing the keyswitch in a depressed condition actuating electrical contacts.

FIG. 7 is a horizontal cross sectional view taken along line 7—7 in FIG. 5.

FIG. 8 is a horizontal cross sectional view taken along line 8—8 in FIG. 6.

FIG. 11 illustrates the keyswitch in an expanded, non-actuating position.

FIG. 12 is a vertical cross sectional view similar to FIG. 11 except showing the keyswitch in a depressed condition actuating an electrical contact.

FIG. 13 is a vertical cross sectional view showing yet another alternative keyswitch structure according to this invention having a modified panel arrangement. FIG. 13 illustrates the keyswitch in an expanded, non-actuating position.

FIG. 14 is a vertical cross sectional view similar to FIG. 13 except showing the keyswitch in an intermediate position.

FIG. 15 is a vertical cross sectional view similar to FIG. 13 except showing the keyswitch in a depressed condition actuating an electrical contact.

FIG. 16 is a vertical cross sectional view of the FIG. 13 keyswitch, and illustrates a preferred embodiment of a force adjustment means for controllably varying the initial depression force required to depress the computer key.

FIG. 17 is a vertical cross sectional view of a modified keyswitch structure similar to the FIG. 13 key design. FIG. 17 illustrates the keyswitch in an expanded, non-actuating position.

FIG. 18 is a vertical cross sectional view similar to FIG. 17 except showing the modified keyswitch in a depressed condition actuating an electrical contact.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The disclosure contains several different embodiments according to this invention. Where appropriate, like components or features will be referenced with the same numeral. To avoid redundant discussion, only different or distinct features of one embodiment as compared to another embodiment will be discussed in detail.

A preferred embodiment of the improved keyboard is illustrated in FIG. 1 showing an alphanumeric keyboard designated generally with the numeral 10 that is an integral component of a lap top or notebook personal computer 12. The keyboard 10 includes a plurality of full-travel self leveling keyswitches 14. In the preferred embodiment, the keyswitches include alphanumeric keyswitches and function keyswitches. The keyswitches 14 have a low profile design that is principally illustrated in FIGS. 5 and 6. Low profile meaning that the distance "h" between the top of the key cap and the bottom of a support plate is approximately eight millimeters or less (FIGS. 5, 6, 11, and 12). In the preferred embodiment, each of the keyswitches has a full-travel feature meaning that the keytop travels a distance "t" of approximately four millimeters from its elevated non-actuating position to a depressed actuating position as illustrated in FIGS. 5, 6, 11, and 12.

Figure 10:
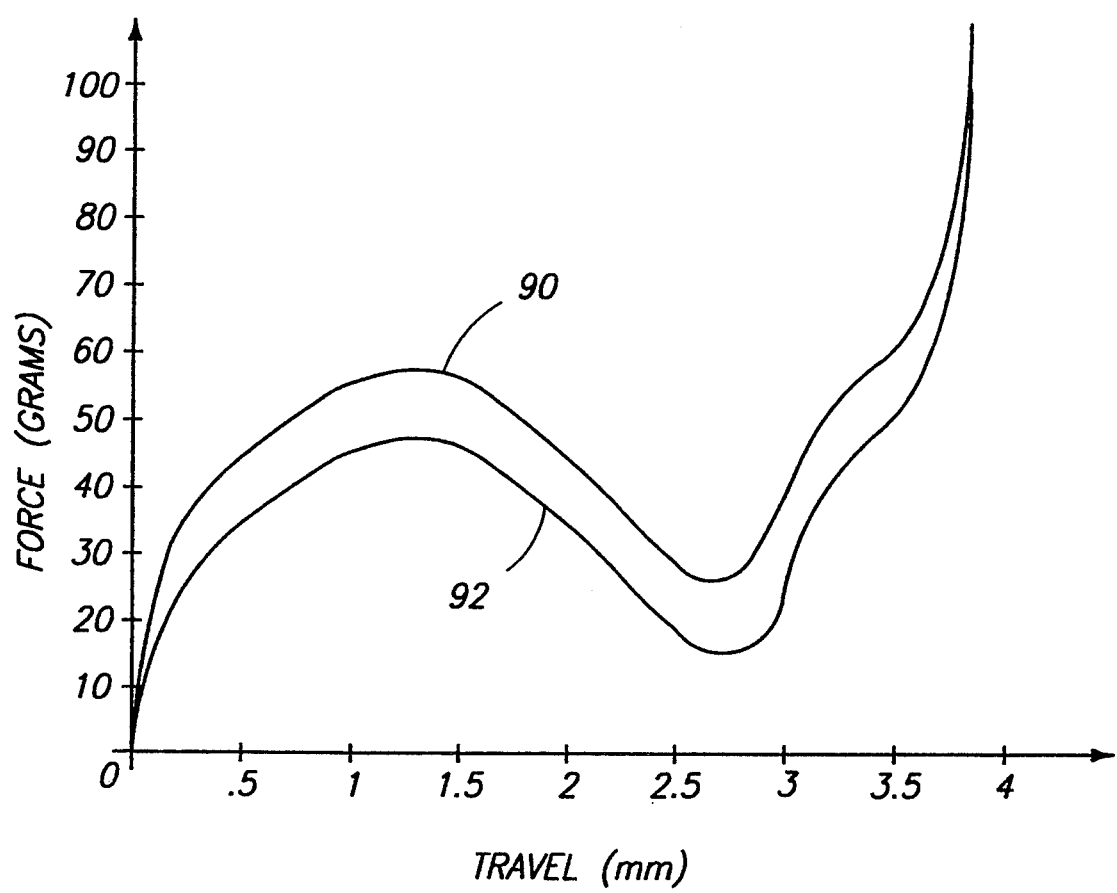
FIG. 10 is a graph showing the force versus travel of a keyswitch during both the downward motion and the upward motion in providing a substantially full-travel keyswitch with a tactile feel feature.

In addition to having a low profile design with a full travel capability, each keyswitch has a tactile field (force-displacement characteristic) as illustrated in FIG. 10 in which the force required to initially depress the switch is greater than the force required to continue the downward movement through switch contact. Additionally, each of the keyswitches 14 have an overtravel feature in which the keyswitch may be further depressed after electrical contact has been made.

The keyswitches 14 are arranged in the keyboard array or pattern at specific keyswitch locations dictated by the specific keyboard design and application. Although the alphanumeric keyboard 10 is illustrated in conjunction with a lap top or notebook personal computer, such alphanumeric keyboard 10 may be utilized in many other data entry environments.

The keyboard 10 includes a keyboard housing 15 that houses the keyswitches 14. A rigid backing plate 16 is provided to support the keyswitches 14 as part of the keyboard 10 (FIGS. 3 and 6). The backing plate 16 may be made of a metal, or rigid plastic. In some embodiments, the rigid backing plate 16 may be an integral portion of the keyboard housing 15.

The keyboard 10 includes a printed circuit board 18 as an integral part of the keyswitch for generating electrical signals through electrical contacts when the keyswitch is depressed.

In the preferred embodiment as illustrated in FIGS. 5 and 6, printed circuit board 18 is in the form of a flexible membrane structure having a membrane layer 20 with electrical contact elements 22 printed thereon at each keyswitch location. The printed circuit board 18 further includes a second membrane layer 24 having complementary electrical contacts 26 printed thereon. Preferably the membrane layers 20 and 24 are separated by spacer layer 28. Although a specific separate spacer layer 28 is illustrated in the drawings, the necessary spacing between electrical contacts 22 and 26 may be provided by rather thick non-conductive traces formed on the membrane layers 20 and 24. In the embodiment illustrated in FIGS. 5 and 6, the spacer layer 28 has a section 30 between the keyswitch locations and a central section or island 32 at the keyswitch location itself. The electrical contact areas 22 and 26 are located between the spacer sections 30 and 32.

The keyboard 10 further includes an integral key structure 40 overlying the printed circuit board 18 that is constructed from a moldable synthetic resin material; preferably of an elastomeric material such as polypropylene, or thermo-plastic elastomers. The integral key structure 40 includes a plurality of keytops 42 and a keytop support substructures 44. Each of the keytops 42 has a top surface 42a and a lower surface 42b (FIGS. 5 and 6). The lower surface 42b defines a cavity 43 immediately below the keytop 42.

The keytop support substructure 44 includes a base sheet 46 that overlies the printed circuit 18 having openings or apertures 47 at each keyswitch location. The individual key support means 48 prevents any noticeable lateral movement or wobble of the keytop 42 as it is depressed.

The individual keytop support elements 48 include, in a preferred embodiment, at least three hinge members and preferably four hinge members 50a, 50b, 50c and 50d that are arranged in a substantially rectangular configuration with hinge elements 50a, 50c and 50b, 50d forming opposed hinge pairs.

Each of the hinge members 50 includes a rigid upper hinge panel 52 that is integrally connected to the keytop 42 through an upper hinge web 54 defining an upper pivot axis 56. The rigid upper hinge panel 52 is designed to pivot about the upper pivot axis 56 from an expanded orientation (FIG. 5) to a contracted orientation illustrated in FIG. 6.

The hinge member 50 further includes a rigid lower hinge panel 58 that is integrally interconnected to the base sheet 46 through a lower hinge web 60 defining a lower pivot axis 62. The lower hinge panel 58 is designed to pivot between an expanded orientation illustrated in FIG. 5 to a contracted orientation illustrated in FIG. 6 in which the lower hinge panel 58 projects into the aperture 47 as illustrated in FIG. 6. The upper hinge panel 52 and the lower hinge panel 58 are interconnected by an integral intermediate web 64 defining an intermediate pivot axis 66. The upper pivot axis 56 is positioned inward from the lower pivot axis 62 relative to the linear path of the keytop to cause the upper hinge panel 52 and the lower hinge panel 58 to pivot inward to a contracted and slightly downward orientation during overtravel.

Although the panels of this embodiment are configured to fold inward beneath the keytop, the panels can be arranged to fold outward as the keytop is depressed. An example of this alternative panel arrangement is described below with reference to FIGS. 13–18.

It should be noted that the upper hinge panel 52 and the lower hinge panel 58 when in the expanded condition are substantially upright at a slight bend in which the combined bend angle 0 as illustrated in FIG. 5 is preferably between 170° and 178°. Such a feature causes the keyswitch to exhibit a tactile field characteristic requiring a rather large force to initially depress the keyswitch and then a lesser force to continue the movement of the keytop during switch contact as illustrated in the force versus travel diagram illustrated in FIG. 10.

The rigid upper hinge panel 52 includes an outer face surface 70 and an inner face surface 72. The distance between the surfaces 70 and 72 is preferably much greater than the corresponding thickness of the webs 54, 60 and 64 so that the thickness of the upper hinge panel provides considerably greater rigidity so that the upper hinge panel 52 will not buckle or appreciably bend as the keytop is depressed. The rigid upper hinge panel 52 extends between side surfaces 74 and 76 (FIG. 5). It should be noted that in the preferred embodiment the side surfaces 74 and 76 are inclined inward from the upper hinge web 54 to the intermediate hinge web 64.

The rigid lower hinge panel 58 includes an outer face surface 78 and an inner face surface 80 defining a thickness that is considerably greater than the thickness of the webs 54, 60 and 64 so that the lower hinge panel does not buckle or appreciably bend but remains rigid relative to the webs as the keytop is depressed. The rigid lower hinge panel 58 includes side surfaces 82 and 84 that are inclined from the lower pivot axis 64 to the intermediate pivot axis 66 to form a "V" orientation, in conjunction with side surfaces 74 and 76, so that as the hinge members 50 fold inwardly they do not interfere with each other as illustrated in FIGS. 7 and 8. It should be noted that preferably the distance between the side surfaces 74, 76 and 82, 84 is greater than 50% of the side dimension of the keytop 42 to maintain a rigid parallelogram configuration to maintain the keytop in a self leveling orientation as it is depressed to prevent lateral movement of the keytop.

It should be further noted that the inward face surface 80 of the lower hinge element serves as an actuating member for engaging and deflecting the membrane layer 20 downward bringing electrical contact 22 into engagement with electrical contact 26 to generate an electrical signal indicating that the particular keyswitch has been depressed. It should be noted that overtravel is provided by further pivotal movement of the hinge panels 52 and 58 about the pivot axes 56 and 62.

The integral key structure 40 further includes anchors 86 (FIGS. 5 and 6) that are formed integrally with the base sheet 46 for projecting downward through the membrane layers 20, 24, the spacer layer 28 and through the rigid backing plate 16 to anchor or secure the integral key structure 40 to the backing plate 16. Alternative techniques may be utilized for anchoring the integral keyswitch structure 40 to the base plate 16.

FIG. 10 illustrates the depression and release force-distance curves for the keyswitches as the keytops are depressed and released. The depression force-distance curve is depicted by the line 90. The release force-distance curve is depicted by the line 92. It should be noted that the force varies non-linearly with respect to distance to provide an initial large force for initial depression and a lower force when contact is made.

It is desirable that the integral key structure 40 be formed of a moldable synthetic resin elastomeric material. Preferably the elastomeric material is of a rather uniform density in which the webs 54, 60 and 64 are defined by narrowed regions and the upper hinge panel 52 and the lower hinge panel 58 are defined by much thicker regions so that the hinge panels are rather rigid and the webs 54, 60 and 64 are rather flexible and resilient with sufficient resiliency to cause the hinge members to move from the contracted orientations to their expanded orientations when the keyboard operator's finger is removed from the keytop 42. Alternatively, the elastomeric material may have a varied density to provide varied flexible resilient properties.

Figure 9:
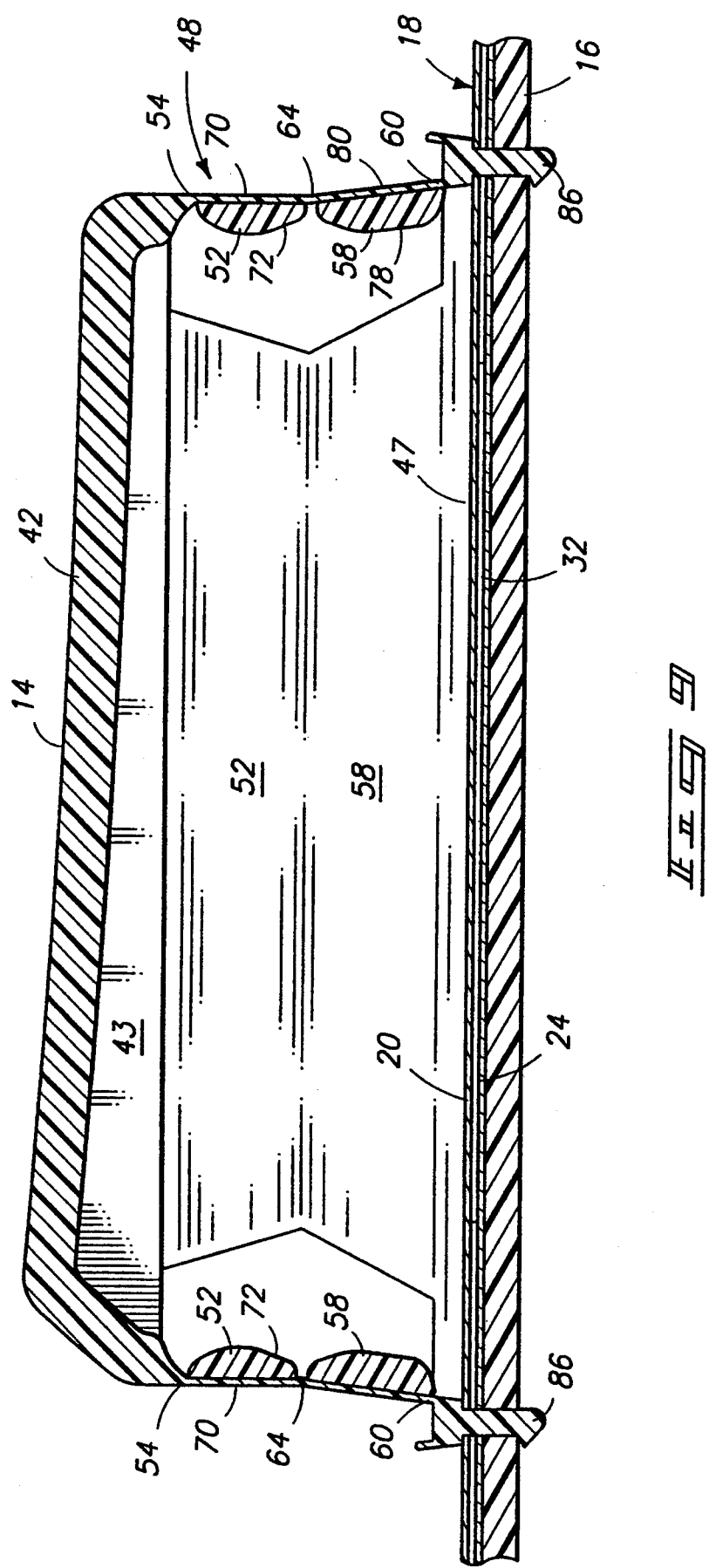
FIG. 9 is a vertical cross sectional view similar to FIG. 5 except showing an alternative keyswitch design.

As an alternative construction, the unitary keyswitch structure 40 may be formed of disparate synthetic resin materials to provide the necessary rigidity and resiliency of the hinge members. For example in FIG. 9, the integral key structure 40 is illustrated with the keytop 42, webs 54, 60, 64 and the base sheet 46 formed of one material that has elastomeric properties. The upper hinge panel 52 and the lower hinge panels 58 are formed of a disparate synthetic resin material in a two shot molding operation to provide the desired rigidity in the upper panel 52 and the lower panel 58.

Figure 11:
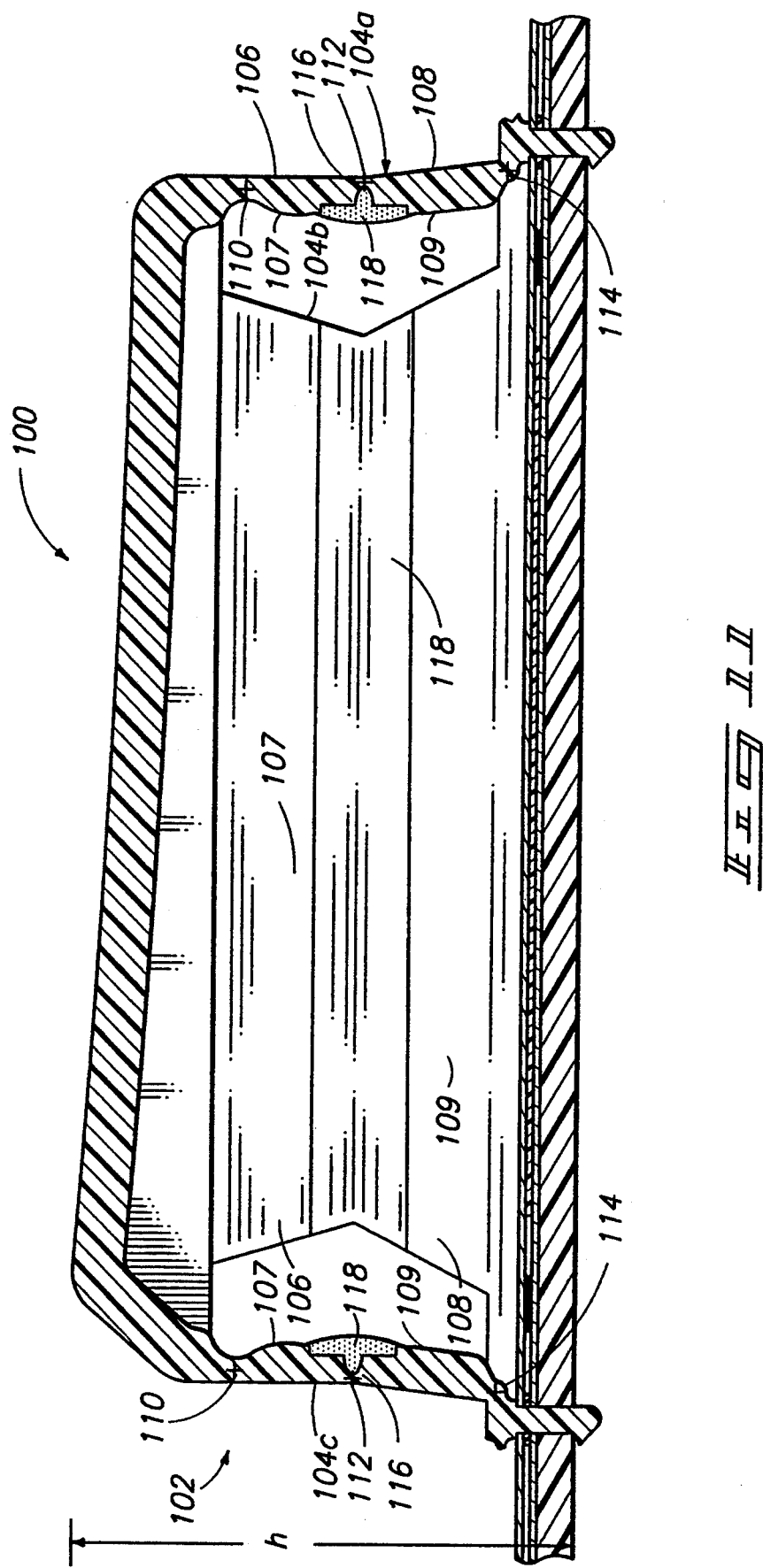
FIG. 11 is a vertical cross sectional view similar to a view taken along line 5—5 in FIG. 2 showing another alternative keyswitch structure according to this invention.

FIGS. 11 and 12 show another keyswitch structure 100 having modified keytop support elements 102 formed of two different types of materials. Support elements 102 preferably include four panel elements 104a, 104b, 104c, and 104d that are arranged in a substantially rectangular configuration (panel element 104d not being depicted in this view). Individual panel elements have an upper hinge panel 106, a lower hinge panel 108, and webs 110, 112, and 114. The operation of the panel elements are essentially the same as panel elements 50a–50d described above.

Intermediate web 112 includes of a joint 116 which integrally interconnects the upper and lower panels 106, 108. Joint 116 is formed of the same material as found in the panels. A synthetic resin material is preferred. Intermediate web 112 also has a resilient material 118 provided at the joint to urge the hinged panels 106 and 108 toward their expanded orientation. When the keytop is depressed as shown in FIG. 12, resilient material 118 is stretched and yields under the force exerted by the keyboard operator. However, when the operator releases the keytop, the resilient material 118 of web 112 elastically drives the panels back to the expanded orientation, thereby returning the keytop to the non-actuating, rest position (FIG. 11).

In this example, resilient material 118 spans across joint 116 and is connected to, and lies partially on, interior surfaces 107 and 109 of respective upper panel 106 and lower panel 108. The interior surfaces 107 and 109 can be specially contoured, as shown, to accommodate the resilient material. The resilient material 118 can be formed of rubber, elastomers, or preferably, a composite of rubber and polypropylene. Such as composite is sold under the trademark Sanaprine.

It can be appreciated that the alphanumeric keyboard 10 has many advantages including the ability to be able to be manufactured at a relatively low cost while still providing for a low profile, full travel keyswitch structure that retains and provides for tactile feel and overtravel. It is further recognized that the individual keytop support elements 48, 102 not only maintain the keytop in a linear path without wobble or lateral movement but additionally provides the actuation structure for actuating the electrical contacts without having to utilize other mechanisms.

FIGS. 13-15 show a computer keyswitch structure 130 having a different panel construction and arrangement which can be incorporated into keyboard 10. Key 130 includes a keytop 132 and a keytop support element 134 which are preferably formed as an integral, unitary structure. Key 130 can be formed integrally with multiple other keys to form a unitary group of keys, similar to the structure discussed above with reference to FIG. 3, or can be constructed as a single key. It is preferred to have the flexibility to form the keys as groups, rows, or individually to satisfy various keyboard configurations. For example, the entire QWERTY key section may be formed of a single unitary structure, the function keys may be formed as a row of integrally connected keys, and the "escape" key may be formed as an individual component.

Keytop support element 134 is designed to buckle as the a downward force is applied to the ;keytop 132. Keytop support element 134 guides the keytop along a linear path, without appreciable lateral wobble, from a rest, non-actuating position (FIG. 13) through an intermediate position (FIG. 14) to a depressed, actuating position (FIG. 15). Keytop support element 134 comprises multiple, and preferably, four hinge elements or panel assemblies 136a, 136b, 136c, 136d, of which only opposing paired hinge elements 136a and 136c are illustrated for purposes of clarity and explanation. Panel assemblies 136a and 136c interconnect base elements 138a and 138c with keytop 132. Keyswitch structure 130 is connected to base plate 16 via clips 139 which pass through apertures in plate 16 and printed circuit board 18.

Individual hinge elements 136a and 136c include an upper hinge panel 140, a lower hinge panel 142, and an intermediate webbing 144. Upper panel 140 is hingeally coupled to keytop 132 via an upper web 145 for pivotal movement about an upper pivot axis 146 between a normally extended orientation when the keytop 132 is in the rest, non-actuating position of FIG. 13 and a contracted orientation when the keytop 132 is in the depressed actuating position of FIG. 15. Lower panel 142 is hingeally coupled to the base element via a lower web 147 to pivot about a lower pivot axis 148 in coordination with the pivotal movement of the upper hinge panel 140 between the normally expanded orientation and the contracted orientation. Intermediate web 144 interconnects the upper panel 140 and the lower panel 142 to permit pivotal movement about an intermediate axis 150 as the upper and lower panels move between the expanded and contracted orientations.

Upper and lower panels 140, 142 are arranged in a diagonal pattern relative to keytop 132 and base 16. The panels are aligned along panel axes 152 (FIG. 13) between base elements 138a, 138c and keytop 132 which are transverse to the planes defined by the keytop 132 and the base 16. More particularly, panel axes 152 are angled by angles $\phi$ relative to a central axis 154, whereby central axis 154 also defines the linear path followed by the keytop 132 during its movement between the non-actuating and depressed actuating switch positions. Preferably, each angle $\phi$ is in a range of approximately 25-55 degrees.

Keytop 132 has a top surface 132a and a lower surface 132b, and in combination with keytop support element 134, define an internal cavity 133 immediately below the keytop 132. According to another aspect of this invention, keytop 132 has a deflectable plunger 135 for actuating the keyswitch. Plunger 135 is aligned above an electrical switch 158 of switch membrane 18, wherein the switch 158 has an upper electrical contact 22 and a lower electrical contact 26. The plunger and electrical switch are positioned centrally along axis 154, although other positions are possible.

The panels of key 130 are arranged to fold outwardly, but in such a manner that does not interfere with neighboring keys. As the computer key 130 is depressed from its rest position (FIG. 13) to an intermediate position (FIG. 14), upper panel 140 pivots about axis 146 through an outward path away from central axis 154 (i.e., the left upper panel moves clockwise about axis 146 and the right upper panel moves counterclockwise about axis 146) and lower panel 142 pivots outwardly about axis 148 (i.e., the left lower panel moves counterclockwise about axis 148 and the right lower panel moves clockwise about axis 148). In this intermediate position, the longitudinal profile of the key remains within an acceptable area represented by boundary lines 156 (FIG. 14). Accordingly, even though the panels are configured to buckle outwardly, they do not enter the key space of neighboring keys and thus, do not disrupt or otherwise interfere with the operation of other keys.

As the computer key is depressed beyond the intermediate position, upper panel 140 continues to pivot outwardly about upper axis 146 (i.e., the left upper panel moves clockwise and the right upper panel moves counterclockwise). However, lower panel 140 stops moving in the outward direction and begins pivoting back inwardly about lower axis 148 (i.e., the left lower panel moves clockwise and the right lower panel moves counterclockwise).

As the key 130 continues downward travel to its fully depressed position in FIG. 15, upper panel 140 and lower panel 142 pivots about their respective axes 146 and 148 until the panels reach the fully buckled, folded, or contracted positions. Also during this time, plunger 135 pushes upper electrical contact 22 into lower electrical contact 26 to actuate the keyswitch. Plunger 135 is preferably formed of a resilient material and deflects or otherwise deforms after engaging and actuating the electrical switch 158. The deformable plunger ensures good electrical contact between contacts 22 and 26 and creates a tactile overtravel feel to the keyboard operator. Plunger 135 can be configured to different lengths and deformable characteristics as desired to control the distance the key is depressed to actuate the switch and the amount of over travel following actuation. The panel assemblies 136 urge the keytop back to the rest position of FIG. 13 when the downward force thereto is removed.

According to another aspect of this invention, keytop support element 134 has a panel stop 160 for holding the upper and lower hinge panels 140, 142 in a selected arrangement when the panels are in their expanded orientations (FIG. 13). Panel stop 160 prevents the panel assemblies 136 from buckling inward beneath the keytop 132 as the keytop is depressed. Panel stop 160 can be shaped in a variety of ways. In this example, panel stop 160 is embodied as an angled projection or flange extending from lower panel 142 inwardly to cavity 133 and toward base 16. Panel stop 160 has a flat surface 162 which abuts against the switch membrane 18. The flange runs longitudinally across at least half of the lower panel. Alternative embodiments of the panel stop include one or more pegs or pins that project inwardly and downward from the lower panel.

Individual panel stops 160 can be sized to create the desired initial force resistance to depression of the keytop. For example, if the panel stop is lengthened, the lower panel 142 is held in a more vertical orientation and the initial force resistance is less. Conversely, if the panel stop is shortened, the lower panel 142 is held in an angled orientation more and aligned with upper panel 140, thereby increasing the initial force resistance.

FIG. 16 illustrates another feature of a keyboard constructed according to this invention which allows the user to adjust the initial force resistance of the computer keys. The keyboard includes a force adjustment means for controllably varying the selected panel arrangement to change the initial force resistance. In the preferred form, force adjustment means is embodied as a subplate 164 movably mounted beneath base plate 16 to vertically raise and lower. Subplate 164 has plural members or platforms 166 which project upward through apertures 168 formed in base 16 and switch membrane 18. Apertures 168 are sized larger than platforms 166 to permit the platforms to easily pass therethrough.

As subplate 164 is raised and lowered, the platforms 166 engage the panel stops 160 at different elevations above base 16. This variation causes changes in the arrangement of the upper and lower hinge panels 140 and 142. As the platforms 166 are raised, the force resistance to depression of the keytop is decreased; conversely, as the platforms 166 are lowered, the initial force resistance is increased.

Subplate 164 may be designed to be manually adjusted by the keyboard operator via a lift mechanism (not shown) accessible to the operator. Alternatively, subplate 164 may be designed to be adjusted to several elevations, but is fixed to a selected elevation during manufacturing and prior to shipping.

In the embodiment of FIGS. 13-16, key 130 (including keytop support structure 132 and keytop 134) is formed of a single material. The single material is preferably a unique composite consisting of a resilient substance, polypropylene, and a fibrous substance. This special composite achieves the desired stiffness in the panels and yet provides the required resilient flexing at the webbings. The resilient substance is preferably a rubber or elastomer, or most preferably, a composite of rubber and polypropylene, such as Sanaprine. The fibrous substance is preferably a carbon fiber or glass fiber.

According to this unique formula, the Sanaprine rubber lends return memory force to cause the panel assemblies to spring back to their original, rest state after the depression force is removed. Polypropylene affords durability, giving the key a long life cycle. The glass or carbon fibers add stiffness to the panel regions. When the key is first formed, the fibers run throughout the webbings and panels. Because the webbings have relatively small cross-sectional thicknesses in comparison to the thicker panels, fewer fiber strands traverse through the webbings. When the key is first depressed, these few fiber strands bend or break, thereby weakening the webbing areas and reducing the overall force used to depress the keytop. The fibers remain in tact, however, within the thick panels to strengthen and add rigidity to them. Example ratios of the elements contained in the composite are approximately 50% (by volume) of the resilient substance and approximately 50% (by volume) of a blend of the polypropylene and 40% milled fibers.

FIGS. 17 and 18 illustrate a computer keyswitch 170 constructed similar to keyswitch 130 of FIGS. 13-16, but being formed of two materials. A first or resilient material 172 is used as the common thread to integrally interconnect the keytop 132 and keytop support means 134. Material 172 defines the intermediate webs between the upper and lower panels and the upper and lower webs which interconnect the panel assemblies to the key top and base elements. The first material 172 is preferably Sanaprine rubber. A second or rigid material 174 is then employed to form reinforced hinge panels 140, 142 and the keytop 132. The second material 174 is preferably a composite of polypropylene and fibers (such as carbon and glass fibers).

Key 170 also has a different switch actuation construction. More particularly, keytop 132 has multiple pairs of deflectable plungers 176a/176b and 178a/178b projecting from its bottom surface. Electrical switches 180 of switch membrane 18 are aligned vertically beneath the paired plungers. When key 130 is depressed, plungers 176a/176b and 178a/178b engage and actuate electrical switches 180 and then bend and spread apart in opposing directions as shown to facilitate overtravel. Keytop 132 also has a limiting member 182 that "bottoms out" on the switch membrane 18 to halt downward travel of the keytop 132 after an adequate overtravel distance has been permitted by the deflecting plungers.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:
1. A keyboard comprising:
   a) a plurality of full-travel electrical keyswitches arranged in a keyboard pattern at a plurality of keyswitch locations;

b) a plurality of keytops arranged in the keyboard pattern at the keyswitch locations for receiving fingers of a keyboard operator;

c) a molded unitary keytop support substructure overlying the keyswitches movably supporting the keytops for movement a full-travel distance, comprising:

i) a common base member extending between the keyswitch locations;

ii) a plurality of individual keytop support means associated with respective keytops, in which individual keytop support means interconnect a respective keytop to the base member (1) for permitting the keytop to move in a substantially linear path the full-travel distance between a non-actuating switch position and a depressed actuating switch position without noticeable lateral movement, and (2) for biasing the respective keytop from the depressed actuating position to the non-actuating position;

d) individual keytop support means including a plurality of hinge elements, individual hinge elements having (1) an upper hinge panel hinged to the keytop for pivotal movement about an upper pivot axis between a normally extended orientation when the keytop is in the non-actuating position and a contracted orientation when the keytop is in the depressed actuating position, (2) a lower hinge panel hinged to the base element for pivotal movement about a lower pivot axis in coordination with the pivotal movement of the upper hinge panel between the normally expanded orientation and the contracted orientation, and (3) an elastomeric web integrally interconnecting the upper hinge panel and the lower hinge panel enabling the upper and lower hinge panels to pivot about an intermediate pivot axis as the panels move between the normally expanded orientations and the contracted orientations while preventing lateral movement of the keytop;

e) said elastomeric web being sufficiently resilient to pivot the hinge panels to their expanded orientation when the keytop is released.

2. The keyboard as defined in claim 1 wherein individual keytop support means have at least three hinge elements that are spaced about the keytop to prevent noticeable lateral movement of the keytop as the keytop moves between the elevated position and the depressed position.

3. The keyboard as defined in claim 1 wherein at least one of the hinge elements has actuation means for actuating the associated keyswitch when the hinge element is moved to the contracted position.

4. The keyboard as defined in claim 3 wherein the actuation means includes an integral portion of the lower hinge panel.

5. The keyboard as defined in claim 1 wherein the hinge pivot axes lie in planes that are parallel with each other.

6. The keyboard as defined in claim 1 wherein elastomeric web interconnects the upper and lower hinge panels at an angle of less than 180 degrees about the intermediate pivot axis when the hinge panels are in their extended orientations to cause the hinge panels to fold inward underneath the keytop as the keytop is depressed.

7. The keyboard as defined in claim 6 wherein the angle between the upper and lower hinge panels about the intermediate pivot axis is between 170 degrees and 178 degrees to cause the hinge panels to fold inward underneath the keytop as the keytop is depressed.

8. The keyboard as defined in claim 6 wherein the upper pivot axis, in relation to the linear movement of the keytop, is laterally offset with respect to the lower pivot axis.

9. The keyboard as defined in claim 6 wherein the upper and lower hinge panels are oriented substantially upright with a slight bend at the elastomeric web when the hinge elements are in the extended orientations to support the keytop in the non-actuating position and to provide a varying force resistance to depression of the keytop to transmit a varying tactile feel to the keyboard operator.

10. The keyboard as defined in claim 1 wherein the upper hinge panel and the lower hinge panel are oriented to pivot about the intermediate pivot axis at a combined angle of greater than 120 degrees when moved between the extended orientation and the contracted orientation.

11. The keyboard as defined in claim 1 wherein individual keyboard support means include at least two pair of opposing hinge elements to prevent noticeable lateral movement of the keytop as it is depressed.

12. The keyboard as defined in claim 11 wherein at least one of the lower hinge panels of individual keytop support means includes a keyswitch actuation means for actuating the corresponding keyswitch when the hinge elements are in the contracted orientation.

13. The keyboard as defined in claim 1 wherein the upper hinge panel and the lower hinge panel are oriented to fold outward as the keytop is depressed.

14. The keyboard as defined in claim 1 wherein individual keytops have an upper surface for receiving a finger of a keyboard operator, a lower surface, and a keyswitch actuation plunger projecting from the lower surface of the keytop for actuating a corresponding keyswitch when the hinge elements are in the contracted orientation.

15. The keyboard as defined in claim 1 wherein the upper and lower hinge panels are aligned along a panel axis between the base element and the keytop, the panel axis relative to the linear path followed by the keytop between the non-actuating and depressed actuating switch positions defining an angle in a range of approximately 25–55 degrees.

16. A full-travel keyboard, comprising:

a) a plurality of electrical keyswitches arranged in a keyboard pattern at a plurality of keyswitch locations;

b) a unitary molded key structure overlying the keyswitches having (1) a plurality of keytops arranged in the keyboard pattern at the keyswitch locations for receiving fingers of a keyboard operator and (2) a keytop support substructure integrally molded with the keytops for supporting the keytops a full-travel distance above respective keyswitches;

c) said keyboard substructure comprising:

i) a common base member extending between the keyswitch locations;

ii) a plurality of individual keytop support means associated with respective keytops, in which individual keytop support means integrally interconnect a respective keytop to the base member (1) for permitting the keytop to move the full-travel distance in a substantially linear path between a non-actuating switch position and a depressed actuating switch position without noticeable lateral movement, and (2) for biasing the respective keytop from the depressed actuating position to the non-actuating position;

d) individual keytop support means including a hinge element having (1) an upper hinge panel hinged to the keytop for pivotal movement about an upper pivot axis between an extended orientation when the keytop is in the non-actuating position and a contracted orientation when the keytop is in the depressed actuating position, (2) a lower hinge panel hinged to the base element for pivotal movement about a lower pivot axis in coordination with the pivotal movement of the upper hinge panel between the normally expanded orientation and the contracted orientation, and (3) an elastomeric web integrally interconnecting the upper hinge panel and the lower hinge panel enabling the upper and lower hinge panels to pivot about an intermediate pivot axis as the panels move between the expanded orientations and the contracted orientations while preventing lateral movement of the keytop;

e) said elastomeric web being sufficiently resilient to pivot the hinge panels to their expanded orientation when the keytop is released.

17. The full-travel keyboard as defined in claim 16 wherein individual keytop support means have at least three hinge elements that are spaced about the keytop to prevent noticeable lateral movement of the keytop as the keytop moves between the elevated position and the depressed position.

18. The full-travel keyboard as defined in claim 16 wherein the hinge element has actuation means for actuating the associated keyswitch when the hinge element is moved to the contracted position.

19. The full-travel keyboard as defined in claim 18 wherein the actuation means includes an integral portion of the lower hinge panel.

20. The full-travel keyboard as defined in claim 16 wherein the hinge pivot axes lie in planes that are parallel with each other.

21. The full-travel keyboard as defined in claim 16 wherein elastomeric web interconnects the upper and lower hinge panels at an angle of less than 180 degrees about the intermediate pivot axis when the hinge panels are in their extended orientations to cause the hinge panels to fold inward underneath the keytop as the keytop is depressed.

22. The full-travel keyboard as defined in claim 21 wherein the angle between the upper and lower hinge panels about the intermediate pivot axis is between 170 degrees and 178 degrees to cause the hinge panels to fold inward underneath the keytop as the keytop is depressed.

23. The full-travel keyboard as defined in claim 21 wherein the upper pivot axis, in relation to the linear movement of the keytop, is laterally offset with respect to the lower pivot axis.

24. The full-travel keyboard as defined in claim 21 wherein the upper and lower hinge panels are oriented substantially upright with a slight bend at the elastomeric web when the hinge elements are in the extended orientations to support the keytop in the non-actuating position and to provide a varying force resistance to depression of the keytop to transmit a varying tactile feel to the keyboard operator.

25. The full-travel keyboard as defined in claim 16 wherein the upper hinge panel and the lower hinge panel are oriented to pivot about the intermediate pivot axis at a combined angle of greater than 120 degrees when moved between the extended orientation and the contracted orientation.

26. The full-travel keyboard as defined in claim 16 wherein individual keyboard support means include at least two pair of opposing hinge elements to prevent noticeable lateral movement of the keytop as it is depressed, 27. The full-travel keyboard as defined in claim 26 wherein at least one of the lower hinge panels of individual keytop support means includes a keyswitch actuation means for actuating the corresponding keyswitch when the hinge element is in the contracted orientation.

28. The full-travel keyboard as defined in claim 27 wherein the lower hinge panel has a keyswitch actuation surface for actuating the corresponding keyswitch when the hinge element is in the contracted orientation.

29. The full-travel keyboard as defined in claim 16 wherein the unitary molded key structure includes (1) an upper web integrally interconnecting the upper hinge panel with the keytop and (2) a lower web integrally interconnecting the lower hinge panel with the base member.

30. The full-travel keyboard as defined in claim 29 wherein the unitary molded key structure is formed of a moldable synthetic resinous material in which the upper, lower and intermediate webs are formed of an elastomeric material for biasing the hinge element to the expanded orientation.

31. The full-travel keyboard as defined in claim 30 wherein the hinge panels are substantially rigid and inflexible in comparison to the webs to prevent noticeable lateral movement of the keytop as the keytop is depressed.

32. The full-travel keyboard as defined in claim 31 wherein the hinge panels are formed a disparate, more rigid synthetic resinous material than the webs to prevent noticeable lateral movement of the keytop is depressed.

33. The full-travel keyboard as defined in claim 16 wherein the upper hinge panel and the lower hinge panel are oriented to fold outward as the keytop is depressed.

34. The full-travel keyboard as defined in claim 16 wherein individual keytops have an upper surface for receiving a finger of a keyboard operator, a lower surface, and a keyswitch actuation plunger projecting from the lower surface of the keytop for actuating a corresponding keyswitch when the hinge elements are in the contracted orientation.

35. The full-travel keyboard as defined in claim 16 wherein the upper and lower hinge panels are aligned along a panel axis between the base element and the keytop, the panel axis relative to the linear path followed by the keytop between the non-actuating and depressed actuating switch positions defining an angle in a range of approximately 25-55 degrees.

36. A full-travel keyboard, comprising:
a) a plurality of electrical keyswitches arranged in a keyboard pattern at a plurality of keyswitch locations;
b) a unitary molded key structure overlying the keyswitches having (1) a plurality of keytops arranged in the keyboard pattern at the keyswitch locations for receiving fingers of a keyboard operator and (2)

a keytop support substructure integrally molded with the keytops for supporting the keytops a full-travel distance above respective keyswitches;

c) said keyboard substructure comprising:
 i) a common base member extending between the keyswitch locations having apertures formed therein exposing the keyswitches;
 ii) a plurality of individual keytop support means associated with respective keytops surrounding the apertures, in which individual keytop support means integrally interconnects a respective keytop to the base member (1) for permitting the keytop to move the full-travel distance in a substantially linear path between a non-actuating switch position and a depressed actuating switch position without noticeable lateral movement, and (2) for biasing the respective keytop from the depressed actuating position to the non-actuating position;

d) individual keytop support means including a hinge element having (1) an upper hinge panel hinged by an upper elastomeric web to the keytop for pivotal movement about an upper pivot axis between an extended, substantially vertical, orientation when the keytop is in the non-actuating position and an inward folded contracted orientation underneath the keytop when the keytop is in the depressed actuating position, (2) a lower hinge panel hinged by a lower elastomeric web to the base element for pivotal movement about a lower pivot axis in coordination with the pivotal movement of the upper hinge panel between an expanded, substantially vertical orientation and an inward folded contracted orientation projecting into the aperture, and (3) an elastomeric web integrally interconnecting the upper hinge panel and the lower hinge panel enabling the upper and lower hinge panels to pivot about an intermediate pivot axis as the panels fold inward preventing lateral movement of the keytop as the keytop is depressed;

e) said elastomeric webs being sufficiently resilient to pivot the hinge panels to their expanded orientations when the keytop is released; and f) said hinge elements having keyswitch actuating means for projecting into the aperture when the keytop is depressed for actuating the keyswitch.

37. The full-travel keyboard as defined in claim 36 wherein individual keytop support means have at least three hinge elements that are spaced about the aperture to prevent noticeable lateral movement of the keytop as the hinge panels fold inward as the keytop is depressed.

38. The full-travel keyboard as defined in claim 36 wherein the actuation means forms an integral portion of the lower hinge panel.

39. The full-travel keyboard as defined in claim 36 wherein the hinge pivot axes lie in planes that are parallel with each other.

40. The full-travel keyboard as defined in claim 36 wherein the intermediate elastomeric web interconnects the upper and lower hinge panels at an angle of less than 180 degrees about the intermediate pivot axis when the hinge panels are in their extended orientations to cause the hinge panels to fold inward underneath the keytop as the keytop is depressed.

41. The full-travel keyboard as defined in claim 40 wherein the angle between the upper and lower hinge panels about the intermediate pivot axis is between 170 degrees and 178 degrees to cause the hinge panels to fold inward underneath the keytop as the keytop is depressed.

42. The full-travel keyboard as defined in claim 36 wherein the upper pivot axis, in relation to the linear movement of the keytop, is laterally offset with respect to the lower pivot axis.

43. The full-travel keyboard as defined in claim 36 wherein the upper and lower hinge panels are oriented substantially upright with a slight bend at the elastomeric web when the hinge elements are in the extended orientations to support the keytop in the non-actuating position and to provide a varying force resistance to depression of the keytop to transmit a varying tactile feel to the keyboard operator.

44. The full-travel keyboard as defined in claim 36 wherein the upper hinge panel and the lower hinge panel are oriented to pivot about the intermediate pivot axis at a combined angle of greater than 120 degrees when moved between the extended orientation and the contracted orientation.

45. The full-travel keyboard as defined in claim 36 wherein individual keyboard support means include at least two pair of opposing hinge elements to prevent noticeable lateral movement of the keytop as it is depressed.

46. The full-travel keyboard as defined in claim 36 wherein the lower hinge panel has a keyswitch actuation surface for actuating the corresponding keyswitch when the hinge element is in the contracted orientation.

47. The full-travel keyboard as defined in claim 36 wherein the unitary molded key structure is formed of a moldable synthetic resinous material in which the upper, lower and intermediate webs are formed of an elastomeric material for biasing the hinge panels to their expanded orientations.

48. The full-travel keyboard as defined in claim 36 wherein the hinge panels are substantially rigid and inflexible in comparison to the webs to prevent noticeable lateral movement of the keytop as the keytop is depressed.

49. The full-travel keyboard as defined in claim 36 wherein the hinge panels are formed a disparate, more rigid synthetic resinous material than the webs to prevent noticeable lateral movement of the keytop is depressed.

50. The full-travel keyboard as defined in claim 36 wherein the upper hinge panel and the lower hinge panel are oriented to fold outward as the keytop is depressed.

51. The full-travel keyboard as defined in claim 36 wherein the upper and lower hinge panels are aligned along a panel axis between the base element and the keytop, the panel axis relative to the linear path followed by the keytop between the non-actuating and depressed actuating switch positions defining an angle in a range of approximately 25–55 degrees.

52. A keyboard, comprising:
a) a plurality of electrical keyswitches arranged in a keyboard pattern at a plurality of keyswitch locations;
b) a plurality of keytops arranged in the keyboard pattern at the keyswitch locations for receiving fingers of a keyboard operator;
c) a plurality of individual keytop support means associated with respective keytops for (1) permitting the keytop to move in a substantially linear path between a non-actuating switch position and a depressed actuating switch position without noticeable lateral movement, and (2) biasing the respective keytop from the depressed actuating position to the non-actuating position;

d) individual keytop support means including at least one hinge element coupled to a base element, the hinge element having (1) an upper hinge panel hinged to the keytop for pivotal movement about an upper pivot axis between a normally extended orientation when the keytop is in the non-actuating position and a contracted orientation when the keytop is in the depressed actuating position, (2) a lower hinge panel hinged to the base element for pivotal movement about a lower pivot axis in coordination with the pivotal movement of the upper hinge panel between the normally expanded orientation and the contracted orientation, and (3) a webbing interconnecting the upper hinge panel and the lower hinge panel enabling the upper and lower hinge panels to pivot about an intermediate pivot axis as the panels move between the normally expanded orientations and the contracted orientations while preventing lateral movement of the keytop; and e) the webbing having a joint of first material integrally interconnecting the upper and lower hinge panels and a resilient second material provided at the joint to urge the hinge panels to their expanded orientation when the keytop is released.

53. The keyboard as defined in claim 52 wherein the resilient second material is selected from the group consisting of rubber and elastomers.

54. The keyboard as defined in claim 52 wherein the resilient second material is a composite of rubber and polypropylene.

55. The keyboard as defined in claim 52 wherein:
the upper and lower hinge panels have interior and exterior surfaces; and
the resilient second material is provided partially on the interior surface of the upper hinge panel, across the joint, and partially on the interior surface of the lower hinge panel.

56. The keyboard as define in claim 52 wherein individual keytop support means has at least three hinge elements that are spaced about the keytop to prevent noticeable lateral movement of the keytop as the keytop moves between the elevated position and the depressed position.

57. The keyboard as defined in claim 52 wherein at least one of the hinge elements has actuation means for actuating the associated keyswitch when the hinge element is moved to the contracted position.

58. The keyboard as defined in claim 57 wherein the actuation means includes an integral portion of the lower hinge panel.

59. The keyboard as defined in claim 52 wherein the hinge pivot axes lie in planes that are parallel with each other.

60. The keyboard as defined in claim 52 wherein the webbing interconnects the upper and lower hinge panels at an angle of less than 180 degrees about the intermediate pivot axis when the hinge panels are in their extended orientations to cause the hinge panels to fold inward underneath the keytop as the keytop is depressed.

61. The keyboard as defined in claim 60 wherein the angle between the upper and lower hinge panels about the intermediate pivot axis is between 170 degrees and 178 degrees to cause the hinge panels to fold inward underneath the keytop as the keytop is depressed.

62. The keyboard as defined in claim 52 wherein the upper hinge panel and the lower hinge panel are oriented to pivot about the intermediate pivot axis at a combined angle of greater than 120 degrees when moved between the extended orientation and the contracted orientation.

63. The keyboard as defined in claim 52 wherein individual keytops have an upper surface for receiving a finger of a keyboard operator, a lower surface, and a keyswitch actuation plunger projecting from the lower surface of the keytop for actuating a corresponding keyswitch when the hinge elements are in the contracted orientation.

64. The keyboard as defined in claim 52 wherein the upper and lower hinge panels are aligned along a panel axis between the base element and the keytop, the panel axis relative to the linear path followed by the keytop between the non-actuating and depressed actuating switch positions defining an angle in a range of approximately 25–55 degrees.

65. A keyboard, comprising:
a) a plurality of electrical keyswitches arranged in a keyboard pattern at a plurality of keyswitch locations;
b) a plurality of keytops arranged in the keyboard pattern at the keyswitch locations for receiving fingers of a keyboard operator;
c) a plurality of individual keytop support means associated with respective keytops for (1) permitting the keytop to move in a substantially linear path between a non-actuating switch position and a depressed actuating switch position without noticeable lateral movement, and (2) biasing the respective keytop from the depressed actuating position to the non-actuating position;
d) individual keytop support means including at least one hinge element coupled to a base element, the hinge element having (1) an upper hinge panel hinged to the keytop for pivotal movement about an upper pivot axis between a normally extended orientation when the keytop is in the non-actuating position and a contracted orientation when the keytop is in the depressed actuating position, (2) a lower hinge panel hinged to the base element for pivotal movement about a lower pivot axis in coordination with the pivotal movement of the upper hinge panel between the normally expanded orientation and the contracted orientation, (3) a webbing interconnecting the upper hinge panel and the lower hinge panel enabling the upper and lower hinge panels to pivot about an intermediate pivot axis as the panels move between the normally expanded orientations and the contracted orientations while preventing lateral movement of the keytop, and (4) a panel stop for holding the upper and lower hinge panels in a selected arrangement when the panels are in their expanded orientations; and
e) the upper and lower hinge panels being configured to fold outward as the keytop is depressed.

66. The keyboard as defined in claim 65 wherein the upper and lower hinge panels are aligned along a panel axis between the base element and the keytop, the panel axis being angled relative to the linear path followed by the keytop between the non-actuating and depressed actuating switch positions.

67. The keyboard as defined in claim 65 wherein the upper and lower hinge panels are aligned along a panel axis between the base element and the keytop, the panel axis relative to the linear path followed by the keytop between the non-actuating and depressed actuating switch positions defining an angle in a range of approximately 25–55 degrees.

68. The keyboard as defined in claim 65 wherein the panel stop is provided on the lower hinge panel.

69. The keyboard as defined in claim 65 wherein the panel stop comprises a flange extending at an angle from the lower hinge panel.

70. The keyboard as defined in claim 65 wherein the keytop support means further comprises force adjustment means for controllably varying the selected panel arrangement to change an initial force resistance to depression of the keytop.

71. The keyboard as defined in claim 65 wherein the keytop support means further comprises an adjustable platform provided beneath the panel stop, the panel stop resting against the platform when the panels are in their expanded orientations, the platform being configured to be raised and lowered so that the panel stop engages the platform at different elevations to cause a change in the arrangement of the upper and lower hinge panels and thereby effectuate a change in an initial force resistance to depression of the keytop.

72. The keyboard as defined in claim 65 wherein the keytop and the keytop support means are an integral, unitary structure.

73. The keyboard as defined in claim 65 wherein the keytop and the keytop support means are formed of a single material.

74. The keyboard as defined in claim 65 wherein the keytop and the keytop support means are formed of two materials including a first material used in the web and a second material used in the upper and lower hinge panels.

75. The keyboard as defined in claim 74 wherein:
the first material is a composite consisting essentially of polypropylene and a resilient substance; and
the second material is a composite consisting essentially of polypropylene and a fibrous substance.

76. The keyboard as define in claim 65 wherein individual keytop support means has at least three hinge elements that are spaced about the keytop to prevent noticeable lateral movement of the keytop as the keytop moves between the elevated position and the depressed position.

77. A keyboard comprising:
a) a plurality of electrical keyswitches arranged in a keyboard pattern at a plurality of keyswitch locations;
b) a plurality of keytops arranged in the keyboard pattern at the keyswitch locations for receiving fingers of a keyboard operator;
c) a plurality of individual keytop support means associated with respective keytops for (1) permitting the keytop to move in a substantially linear path between a non-actuating switch position and a depressed actuating switch position without noticeable lateral movement, and (2) biasing the respective keytop from the depressed actuating position to the non-actuating position;
d) individual keytop support means including at least one hinge element coupled to a base element, the hinge element having (1) an upper hinge panel hinged to the keytop for pivotal movement about an upper pivot axis between a normally extended orientation when the keytop is in the non-actuating position and a contracted orientation when the keytop is in the depressed actuating position, (2) a lower hinge panel hinged to the base element for pivotal movement about a lower pivot axis in coordination with the pivotal movement of the upper hinge panel between the normally expanded orientation and the contracted orientation, and (3) a webbing interconnecting the upper hinge panel and the lower hinge panel enabling the upper and lower hinge panels to pivot about an intermediate pivot axis as the panels move between the normally expanded orientations and the contracted orientations while preventing lateral movement of the keytop;
e) the upper and lower hinge panels being configured to fold outward as the keytop is depressed; and
f) the keytop has an actuation means for actuating the associated keyswitch when the hinge element is moved to the contracted position.

78. The keyboard as defined in claim 77 wherein:
the keytop has an upper surface for receiving a finger of a keyboard operator and a lower surface; and
the actuation means comprises at least one plunger projecting from the lower surface of the keytop.

79. The keyboard as defined in claim 77 wherein:
the keytop has an upper surface for receiving a finger of a keyboard operator and a lower surface; and
the actuation means comprises at least one deflectable plunger projecting from the lower surface of the keytop, the plunger (1) actuating the keyswitch and (2) deflecting as the keytop is depressed to create a tactile overtravel feel to the keyboard operator.

80. The keyboard as defined in claim 77 wherein the upper and lower hinge panels are aligned along a panel axis between the base element and the keytop, the panel axis being angled relative to the linear path followed by the keytop between the non-actuating and depressed actuating switch positions.

81. The keyboard as defined in claim 77 wherein the upper and lower hinge panels are aligned along a panel axis between the base element and the keytop, the panel axis relative to the linear path followed by the keytop between the non-actuating and depressed actuating switch positions defining an angle in a range of approximately 25–55 degrees.

82. The keyboard as defined in claim 77 wherein the keytop support means further includes a panel stop provided on the lower hinge panel for holding the upper and lower hinge panels in a selected arrangement when the panels are in their expanded orientations.

83. The keyboard as defined in claim 77 wherein the keytop support means further includes a panel stop for holding the upper and lower hinge panels in a selected arrangement when the panels are in their expanded orientations, the panel stop comprising a flange extending inwardly at an angle from the lower hinge panel.

84. The keyboard as defined in claim 65 wherein the keytop support means further comprises:
a panel stop for holding the upper and lower hinge panels in a selected arrangement when the panels are in their expanded orientations; and
force adjustment means for controllably varying the selected panel arrangement to change an initial force resistance to depression of the keytop.

85. The keyboard as defined in claim 77 wherein the keytop support means further comprises:
- a panel stop for holding the upper and lower hinge panels in a selected arrangement when the panels are in their expanded orientations; and
- an adjustable platform provided beneath the panel stop, the panel stop resting against the platform when the panels are in their expanded orientations, the platform being configured to be raised and lowered so that the panel stop engages the platform at different elevations to cause a change in the arrangement of the upper and lower hinge panels and thereby effectuate a change in an initial force resistance to depression of the keytop.

86. The keyboard as defined in claim 77 wherein the keytop and the keytop support means are an integral, unitary structure.

87. The keyboard as defined in claim 77 wherein the keytop and the keytop support means are formed of a single material.

88. The keyboard as defined in claim 77 wherein the keytop and the keytop support means are formed of two materials including a rigid material used in the upper and lower hinge panels and a resilient material used in the webbing.

89. A keyboard comprising:
a) a plurality of electrical keyswitches arranged in a keyboard pattern at a plurality of keyswitch locations;
b) a plurality of keys arranged in the keyboard pattern at the keyswitch locations, individual keys comprising a keytop for receiving a finger of a keyboard operator and keytop support means for supporting the keytop a distance above a respective keyswitch, the keytop support means (1) permitting the keytop to move in a substantially linear path between a non-actuating switch position and a depressed actuating switch position without noticeable lateral movement, and (2) biasing the respective keytop from the depressed actuating position to the non-actuating position;
c) individual keytop support means including at least one hinge element having an upper hinge panel, a lower hinge panel, and a webbing for interconnecting the upper and lower hinge panels, the hinge element being foldable between an extended orientation when the keytop is in the non-actuating position and a contracted orientation when the keytop is in the depressed actuating position; and
d) the keytop support means being formed of a composite material consisting essentially of a resilient substance, polypropylene, and a fibrous substance.

90. A keyboard as defined in claim 89 wherein the resilient substance is selected from a group consisting of rubber, elastomers, and a composite of rubber and polypropylene.

91. A keyboard as defined in claim 89 wherein the resilient substance is selected from a group consisting of carbon fibers and glass fibers.

92. A keyboard as defined in claim 89 wherein the composite material comprises approximately 50% of the resilient substance and approximately 50% of a blend of the polypropylene and fibrous substance.

93. A keyboard as defined in claim 89 wherein the composite material comprises approximately 50% of the resilient substance and approximately 50% of a blend of the polypropylene and fibrous substance, the blend having a fibrous content of approximately 40% milled fibers.

94. A keyboard as defined in claim 89 wherein:
the composite material comprises approximately 50% of the resilient substance and approximately 50% of a blend of the polypropylene and fibrous substance;
the resilient material is selected from a group consisting of rubber, elastomers, and a composite of rubber and polypropylene; and
the fibrous material is selected from a group consisting of carbon fibers and glass fibers.

95. The keyboard as defined in claim 89 wherein the keytop and the keytop support means are an integral, unitary structure.

* * * * *